US011522963B2

(12) United States Patent
Althaus et al.

(10) Patent No.: US 11,522,963 B2
(45) Date of Patent: Dec. 6, 2022

(54) DISTRIBUTED FEDERATION OF ENDPOINTS WITH PROXY SYNCHRONIZATION

(71) Applicant: RackN, Inc., Austin, TX (US)

(72) Inventors: Gregory S. Althaus, Austin, TX (US); Robert A. Hirschfeld, Austin, TX (US)

(73) Assignee: RackN, Inc., Austin, TX (US)

( * ) Notice: Subject to any disclaimer, the term of this patent is extended or adjusted under 35 U.S.C. 154(b) by 254 days.

(21) Appl. No.: 16/715,299

(22) Filed: Dec. 16, 2019

(65) Prior Publication Data

US 2020/0244755 A1 Jul. 30, 2020

Related U.S. Application Data

(60) Provisional application No. 62/798,857, filed on Jan. 30, 2019.

(51) Int. Cl.
*H04L 67/288* (2022.01)
*H04L 9/40* (2022.01)
*H04L 67/1095* (2022.01)
*H04L 67/563* (2022.01)

(52) U.S. Cl.
CPC .......... *H04L 67/288* (2013.01); *H04L 63/083* (2013.01); *H04L 67/1095* (2013.01); *H04L 67/563* (2022.05)

(58) Field of Classification Search
CPC ............... H04L 63/0815; H04L 63/083; H04L 67/1095; H04L 67/2814; H04L 67/288; H04W 12/06
See application file for complete search history.

(56) References Cited

U.S. PATENT DOCUMENTS

2011/0137879 A1* 6/2011 Dubey ................ G06F 16/1774
707/704
2016/0323289 A1* 11/2016 Tsutsumi .............. H04L 63/108

* cited by examiner

*Primary Examiner* — Gil H. Lee
(74) *Attorney, Agent, or Firm* — Gary Stanford; Huffman Law Group, PC

(57) ABSTRACT

An endpoint of a distributed federation with proxy synchronization including a data center infrastructure, a storage, and an endpoint. The storage stores a state of the data infrastructure and further stores a mirrored state for each of at least one other endpoint. The endpoint includes a communication interface for communicating via a communication network, where the endpoint, in response to receiving a command via the communication interface for changing the mirrored state, forwards the command towards an endpoint that owns the mirrored state via the communication interface. Commands may be forwarded directly or indirectly via one or more intermediary endpoints. An owner endpoint receives a command, updates its local state, and sends one or more events to one or more proxy endpoints to update corresponding mirrored states. A restricted proxy endpoint may store a partial mirrored state. The federation may support bidirectional sharing, synchronization, and resource data sharing.

20 Claims, 11 Drawing Sheets

REGISTRY 1010

| U LIST ||| |
|---|---|---|---|
| STATE (OWNER) | UPDATE EPID | SECURITY CREDENTIALS | — 1012 |
| AAA (204) | 404 | CRED_D | |
| | 504 | CRED_E | |
| CCC (304) | 404 | CRED_D | |
| | 504 | CRED_E | |
| ⋮ | ⋮ | ⋮ | |

| P LIST |||| |
|---|---|---|---|---|
| OWNER EPID (STATE) | FORWARDING EPID | SECURITY CREDENTIALS | CRITERIA | — 1014 |
| 104 (AAA) | 104 | CRED_A | - | |
| 304 (CCC) | 304 | CRED_C | - | |
| W (WWW) | X | CRED_X | CRIT_X | |
| W (WWW) | Y | CRED_Y | CRIT_Y | |
| W (WWW) | Z | CRED_Z | CRIT_Z | |
| ⋮ | ⋮ | ⋮ | ⋮ | |

*FIG. 10*

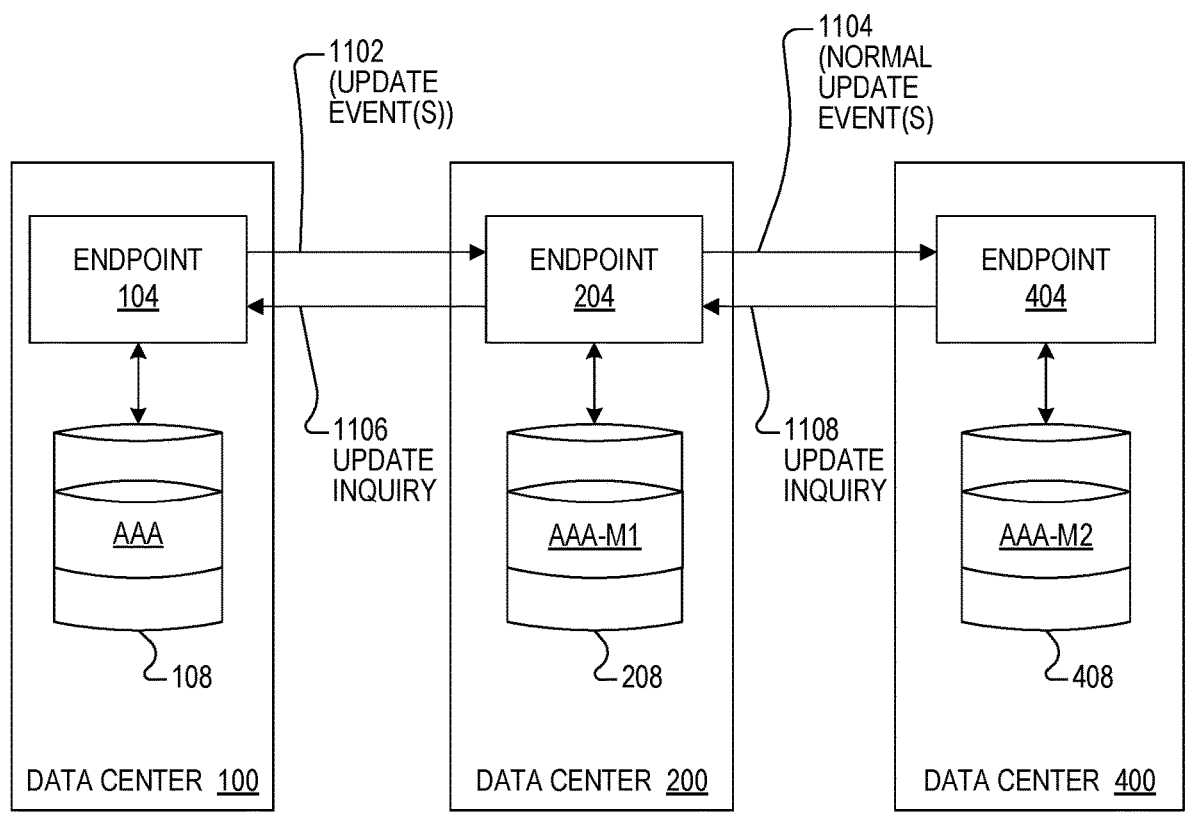
FIG. 11 (SYNCHRONIZATION)

DISTRIBUTED FEDERATION OF ENDPOINTS WITH PROXY SYNCHRONIZATION

CROSS REFERENCE TO RELATED APPLICATION(S)

This application claims benefit of U.S. Provisional Application Ser. No. 62/798,857, filed on Jan. 30, 2019, which is hereby incorporated by reference in its entirety for all intents and purposes.

BACKGROUND OF THE INVENTION

Field of the Invention

The present invention relates in general to data center automation, and more particularly to highly distributed autonomous edge data centers implementing endpoints that operate both autonomously and under hierarchical federated control with proxy synchronization.

Description of the Related Art

A data center or infrastructure is a collection of servers (e.g., computer servers) and other resources for performing computational work. The resources of the data center may include, for example, computational resources, network communications and network access and storage. The computation work may include various applications including computation of various tasks including complex tasks, operation and management of websites, virtual computers execution, access and control, etc. A data center may be located at any one or more of several different site configurations, such as, for example, a home, an automobile, a ship, a space craft, a cell tower, an office or office building, a retail location, a computer center or building, etc.

Managing a single data center may not be overly complicated. Many users, however, own and manage multiple data centers in which each data center should remain autonomous, meaning that each should be successfully operated without human intervention or supervision. Although each data center may be managed independently, such management becomes more difficult as the number of managed data centers increases, so that collective management becomes more practicable. Each data center, however, may be operated differently such that there is a need for a standard management platform including a standard set of operational practices that are consistent across multiple data centers. Some conventional configurations employ a star management architecture including a central management hub that is independently interfaced with each of the primary data centers. The data centers managed by a central hub of a star configuration often compromise site autonomy when network connectivity is unavailable.

Cloud computing introduced the concept of large scale data centers with Application Programming Interface (API) based infrastructure control. Such configuration provided advantages for control and automation using virtualization and infrastructure APIs from a centralized API. The conventional design benefited from scale at individual data centers; however, the conventional configuration did not function well when the number of data centers became significantly large, such as on the order of hundreds of data centers or more.

In a more distributed environment with hundreds or even thousands of integrated data centers, the conventional configuration did not provide aggregated views and hierarchical control of the entire environment without interfering with site autonomy.

SUMMARY OF THE INVENTION

A data center with proxy synchronization as part of a distributed federation according to one embodiment includes a local infrastructure, an endpoint, and a storage. The endpoint manages the local infrastructure and includes a communication interface for communicating via a communication network. The storage stores a local state of the local infrastructure and further stores at least one mirrored state in which each mirrored state is a mirrored copy of another state. The endpoint, in response to receiving a command via the communication interface for changing a mirrored state, forwards the command via the communication interface towards an endpoint that owns the state that is mirrored.

The mirrored state may be provided by at least one provisioning event sent from the other endpoint that owns the state that is mirrored via the communication interface.

The data center may include a registry with a proxy list that provides at least one forwarding identifier for the mirrored state stored in the storage, where the endpoint forwards the command using one of the at least one forwarding identifier. The forwarding identifier may directly identify an endpoint that owns the state so that the command is forwarded directly to the other endpoint. The forwarding identifier may instead identify an intermediate endpoint that does not own the state that is mirrored, in which case the command may be forwarded instead to the intermediary endpoint. The proxy list may include security credentials for one or more of the forwarding identifiers. The proxy list may include at least one criterion or at least one forwarding identifier that specifies at least one condition for forwarding the command.

The storage may store multiple mirrored states for other corresponding endpoints in which the command identifies one of the mirrored states. The registry may include a proxy list that provides at least one forwarding identifier for at least one of the mirrored states, in which case the endpoint forwards the command using at least one forwarding identifier from the proxy list that corresponds with the identified mirrored state. The endpoint may select at least one of multiple forwarding identifiers based on at least one criterion for forwarding the change command from the proxy list. The endpoint may forward the command at least once, each time using a corresponding one of multiple forwarding identifiers.

The endpoint may receive at least one event in which it updates the mirrored state based on received events. A registry may be provided that stores an update list with at least one identifier associated with at least one mirrored state, in which case the endpoint sends at least one event using each identifier upon updating a corresponding mirrored state. The update list may include security credentials for each identifier.

A mirrored state may include an object link for sharing resources of at least one other endpoint. The mirrored state may be a partial mirrored state that does not include the entire state of another infrastructure, in which case the endpoint rejects the command if the command references data that is beyond the bounds of the partial mirrored state.

A distributed federation with proxy synchronization according to one embodiment includes multiple data centers including at least one data center with a proxy endpoint.

Each data center includes a data center infrastructure, storage that stores data of the data center infrastructure, and an endpoint that includes a communication interface for communicating via a communication network. Each data center with a proxy endpoint has corresponding storage that stores a mirrored copy of data owned by another endpoint, in which the proxy endpoint forwards a received command for the mirrored copy of data to at least one other endpoint.

An owner endpoint that owns locally stored data updates the local data in response to a received command, and sends out at least one event via the communication network to at least one of the proxy endpoints to update a corresponding mirrored copy of the local data.

The distributed federation may include multiple data centers each with a proxy endpoint, in which corresponding proxy endpoints synchronize with each other to update corresponding mirrored copies of data. A proxy endpoint may forward a received command for the mirrored copy of data to a proxy endpoint as an intermediary endpoint based on at least one selection criterion. The selection criterion determines conditions for forwarding such as availability. A first endpoint may forward a received command for the mirrored copy of data to at least one intermediary endpoint based on the selection criterion. The first endpoint may forward the received command for the mirrored copy of data to one or more intermediary endpoints, in which multiple intermediary endpoints may be included for purposes of redundancy or the like.

The endpoints may include first and second endpoints with bidirectional sharing, in which the first endpoint includes first storage that stores first data owned by the first endpoint and the second endpoint includes second storage that stores second data owned by the second endpoint. For bidirectional sharing, the first storage stores a mirrored copy of the second data so that the first endpoint is a proxy endpoint for the second endpoint, and where the second storage stores a mirrored copy of the first data in which the second endpoint is a proxy endpoint for the first endpoint. The first and second endpoints may be located at different data centers accessible to each other via the communication network. Alternatively, the first and second endpoints may be located at a common data center and have a common data center infrastructure.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 10 is a simplified block diagram of an exemplary registry according to one embodiment of the present disclosure that may be used by any of the endpoints described herein.

FIG. 11 is a simplified block diagram of a federation illustrating endpoint synchronization according to one embodiment.

DETAILED DESCRIPTION

Figure 1:
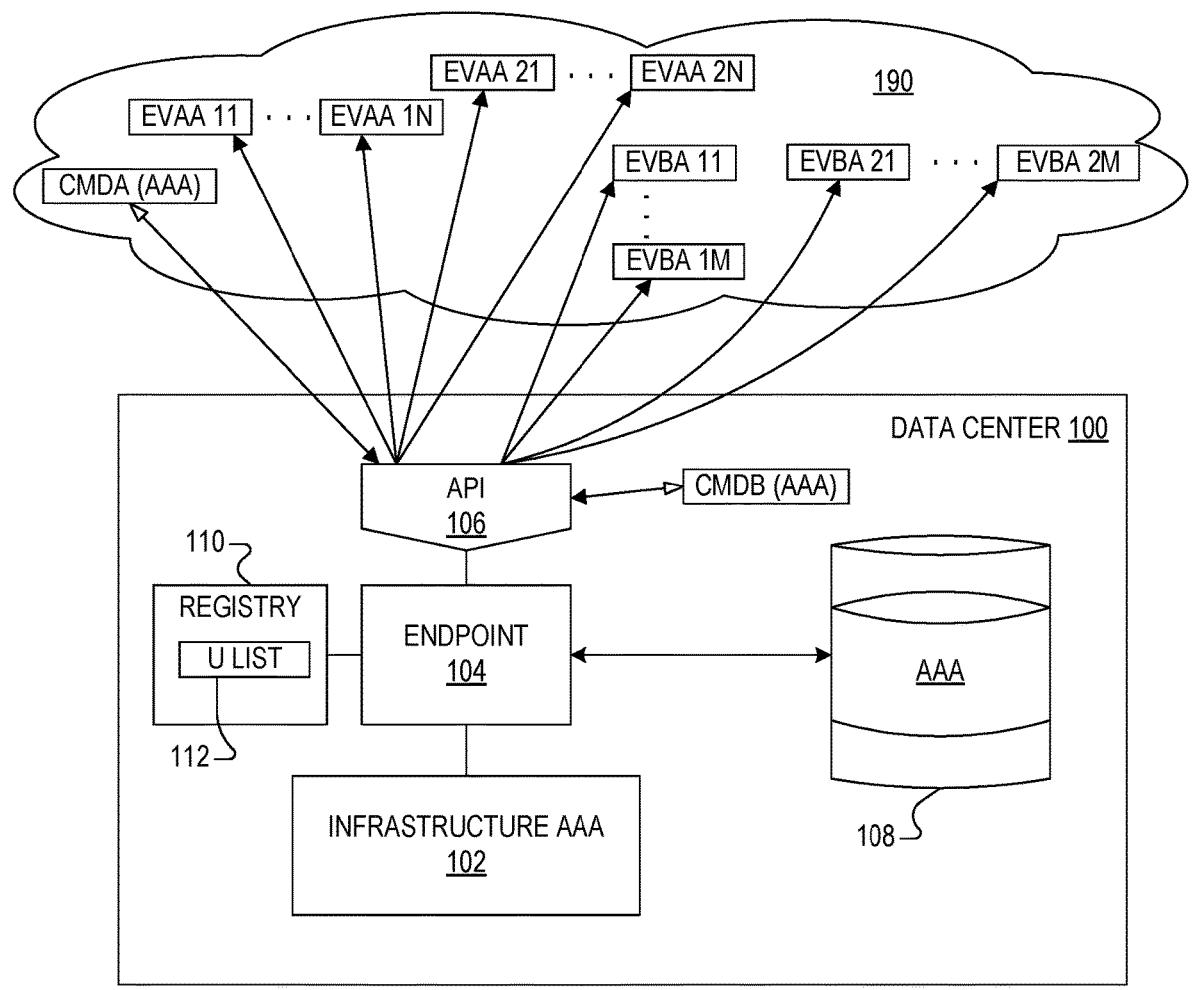
FIG. 1 is a simplified block diagram of a data center implemented according to one embodiment of the present disclosure including a local infrastructure AAA and a corresponding endpoint that exposes a corresponding Application Programming Interface (API) for interfacing a communication network.

The inventors have recognized the need to provide aggregated views and hierarchical control of the entire environment of large scale data centers without interfering with site autonomy. One aspect of the present control strategy is to decouple commands for requesting state change of an infrastructure from data mirror synchronization. In the distributed federation model described herein, an "edge" endpoint is the owner or manager of local data or the source of truth for that local data, in which the endpoint manages local data instead of relying on a centralized state and/or synchronous updates. In this context, an endpoint is a service location for managing an infrastructure including one or more servers and other resources including local storage that stores a state of the infrastructure. An endpoint may also be a "proxy" endpoint for a data center that locally stores a mirrored copy of the state(s) of at least one other infrastructure. A mirrored copy of an endpoint may be stored at multiple data centers, yet is still managed or controlled only by a corresponding edge endpoint. It is noted that an endpoint may be considered as a proxy endpoint for one or more other endpoints when storing mirrored state information from those other data centers, and may be considered as an edge endpoint relative to its own locally stored state information.

Control requests made against a mirrored copy are not implemented locally; instead, the commands are forwarded by proxy to the edge endpoint that owns the data. The edge endpoint acknowledges the change, performs one or more actions that change the state of the local infrastructure, and sends out one or more events to report the changes to any proxy endpoints at other data centers that store mirrored state information. Since data centers are expected to be autonomous, many changes to state are anticipated over an extended period of time. Each change to a state of infrastructure managed by an edge endpoint generates one or more events that are sent to one or more proxy endpoints. These events are used by the proxy endpoints to update their locally stored mirrored copy. Local updates of mirrored information may also create corresponding events which are sent to still other proxy endpoints, such that tiers of managers or proxy endpoints are envisioned that aggregate data. Since each edge and proxy endpoint may have a complete view of the state of an endpoint, they can be operated in a federated system. One goal of the federated system is that operators can execute commands at any level or at any endpoint without knowledge or direct access to the edge endpoints that perform the action for changing the corresponding infrastructure state. Events allow operators to monitor the impact of requests as they occur. At the federation level, operators can work across the system and rely on the proxy endpoints to proxy requests to the correct edge locations.

A useful addition is to distinguish between read-only and writable data in the endpoint storage. This difference is important for infrastructure management because endpoint data has both system state and configuration data. The state information of an endpoint, which is owned by that endpoint, is by nature writable at that endpoint. The configuration data, which is managed centrally and pushed to the edges, is by nature read only at the endpoint. It is expected that only the writable data from the endpoints needs to be mirrored by the federated managers. Mirrored data at a proxy endpoint may be shown as writable, yet the endpoint maintaining the mirrored data does not directly update the mirrored information but instead forwards any change requests (directly or indirectly) to the edge endpoint that owns the data. For writable data, there is still only one owner, also known as the source of truth, at the edge. It is expected that the read only data at the endpoints is managed by a central system and expected to be consistent between some or all endpoints within the federation. Since this data is distributed from a central source, there is no reason to mirror the copies of the edge endpoints. Distinguishing between the two types of data in the system helps with management and scale of the system by reducing the amount of data synchronization and storage required to maintain mirrors.

The implementation may benefit from the ability for Application Programming Interfaces (APIs) to accept and test incremental updates as per the Hypertext Transfer Protocol (HTTP) PATCH specification. This protocol allows asynchronous control requests by reducing the risk of races. This happens because the requests include a test to ensure that the data being changed not be changed by a previous request. This is important because mirror synchronization delays increase as more control layers are added.

FIG. 1 is a simplified block diagram of a data center 100 implemented according to one embodiment of the present disclosure including a local data center infrastructure AAA 102 and a corresponding endpoint 104 that exposes a corresponding Application Programming Interface (API) 106 for interfacing a communication network 190. Although the data center 100 is shown including only one infrastructure and endpoint, a data center may support multiple infrastructures and endpoints as further described herein. The communication network 190 may include a local portion, such as a local area network (LAN) or the like, but generally includes a significantly wider portion, such as a global computer network including the internet or the like, which is used for interfacing remote endpoint data centers. Each data center described herein, including the data center 100, may be located at any one or more of several different site configurations, such as, for example, a home, an automobile, a ship, a space craft, a cell tower, an office or office building, a retail location, a computer center or building, etc.

The infrastructure AAA 102 incorporates one or more computer servers and other resources for performing the functions and services of the data center 100. The endpoint 104 at the data center 100 operates as an infrastructure controller which is a local service or process or the like that manages the functions of the infrastructure AAA 102. Although the endpoint 104 may be located on or otherwise executed by a server of the infrastructure AAA 102, the endpoint 104 may also be executed by a separate or even external server or processor to maintain control in the event one or more of the devices of the infrastructure AAA 102 become unavailable, such as being shut down or reset or the like.

The API 106 exposed by the endpoint 104 enables communication with external computers and resources including other data centers via the communication network 190 as further described herein. These external interactions include commands that are requests to change the state of an infrastructure including, for example, the infrastructure AAA 102. Commands may be initiated by a user directly or via a Command Line Interface (CLI), by a Web client, or by any other client or user. The interactions may also be initiated by other systems on behalf of a user.

The endpoint 104 interfaces a storage 108 which stores state and configuration information of the infrastructure AAA 102 shown as a state AAA. The storage 108 may include any combination of data storage devices, such as disk drives (including magnetic disk drives, solid state drives, optical drives, etc.) used for long term storage of data and information. The storage 108 stores the state AAA which includes permanently stored digital content, data, and other information that defines the current configuration of the infrastructure AAA 102. Any change of the configuration of the infrastructure AAA 102 results in a corresponding modification of the locally stored state AAA. It is also noted that the storage 108 storing the state AAA may be separate from the infrastructure AAA 102 but may also be part of the infrastructure AAA 102. In any event, the state AAA is considered independent of the infrastructure AAA 102 and the storage 108 even if stored within.

As described further herein, a command is a request for changing or updating the configuration or state XXX of an infrastructure XXX, in which "XXX" denotes a generic placeholder. For example, a command may include a request for changing or updating the state or configuration of the infrastructure AAA 102, in which the endpoint 104 makes the indicated changes to the infrastructure AAA 102 in accordance with the specified in the command and also updates the stored state AAA accordingly. In this manner, the endpoint 102 manages the infrastructure AAA 102 and may also be considered the owner of the state AAA so that any updates or modifications may only be performed by the endpoint 104.

Although shown separately, the storage 108 may also store a registry 110 that corresponds with the contents of the storage 108 including the state AAA. The registry 110 may include an "update" list (U LIST) 112 that lists one or more other endpoints that may store a mirrored copy of all or a portion of the state AAA. When the state AAA is updated or modified by the endpoint 104, the endpoint 104 may consult the U LIST 112 of the registry 110 for communicating the changes to the other endpoints as further described herein. In the illustrated embodiment, the endpoint 104 at data center 100 only operates as an "edge" endpoint in which the local storage 108 only stores the state AAA of the infrastructure AAA 102 and does not store mirrored state information of other infrastructures or endpoints. Thus, the endpoint 104 does not serve as a proxy endpoint and may be isolated from conventional infrastructure services. Edge locations may have limited network bandwidth or latency and may also have limited physical access. It is noted, however, that an endpoint may be and edge endpoint for its own state information and may be a proxy endpoint for other edge endpoints as further described herein.

A first command CMDA for modifying (or targeting) the infrastructure AAA 102 is received by the API 106 from the communication network 190, shown as CMDA (AAA). An arrow from CMDA to the API 106 is shown as a bidirectional arrow having a solid or filled arrow at one end (at the API 106) showing the direction of the command flow and an unfilled arrow at the other end (at the CMDA) indicating an acknowledgement. In one embodiment, the command request may be processed and acknowledged synchronously in accordance with the Hypertext Markup Language/Representational State Transfer (HTML/REST) API protocol, where it is understood that alternative synchronous or even asynchronous protocols may be used instead. A command is a request to update data or information or make any other state or configuration changes of a target infrastructure. Since the infrastructure AAA 102 is located at data center 100 including endpoint 104 as the owner of state AAA, the endpoint 104 receives and fulfils the command CMDA and updates the state AAA to reflect the updated state.

While fulfilling the command CMDA, the endpoint 104 creates one or more transactions and state changes within the of the infrastructure AAA 102 that are reflected by updating the state AAA. These transactions and state changes are announced externally in the form of one or more events. An "event" is a general purpose notification generated by the system for internal or external consumption. Events help coordinate activities within and between systems by allowing them to be alerted instead of having to poll or watch for interesting changes. The fulfilling of a single command may generate any number of events depending on the request. For example, a data state change event is generated if the command involved changing data in the endpoint storage. Additional events may be generated by the processing of the command such as starting services, changing related data or security activity. There are thousands of potential events that could be triggered by any single command.

As shown, fulfilling the command CMDA generates a first set of "N" events EVAA 11 to EVAA 1N and a second set of "N" events EVAA 21 to EVAA 2N, in which N is 1 or more. The first set of events EVAA 11 to EVAA are sent to update a first endpoint at a first data center, the second set of events EVAA 21 to EVAA 2N are sent to update a second endpoint at the first data center or a second data center, and so on. In one embodiment, the set of one or more events may simply be transmitted to the same endpoint from which the command CMDA was received. In addition, or in the alternative, the endpoint 104 consults the U LIST 112 and sends the one or more events to each endpoint or data center listed therein. The events sent from the endpoint 104 may be sent directly to the entire set of proxy endpoints storing a mirrored copy of the state AAA, or to any selected subset thereof. As further described herein, recipients of the events update their local mirrored copy generating additional events which may be propagated to yet other proxy endpoints. The events or sets of events may be duplicates with each other to update multiple data centers or entities in the same manner. It is noted that while each command may have only one requestor, any event may have none, one or multiple recipients via subscription. An event recipient does not need to have any awareness of the command that caused it to be generated. The U LIST 112 may also include any requisite security credentials, such as username/password pairs, security tokens, etc., for accessing each proxy endpoint and/or corresponding data center.

Whereas the command CMDA was sent from a remote data center or entity via the communication network 190, commands may also originate from a local source at the data center 100, such as generated by a process or application executed on a local server. As shown, for example, a second command CMDB is generated locally for updating the state AAA of the local infrastructure AAA 102, shown as CMDB (AAA). The command CMDB may be received by the API 106 as shown or may be directed to the endpoint 104. In either case, the endpoint 104 creates one or more transactions and state changes within the infrastructure AAA 102 that are reflected by updating the state AAA. In a similar manner as for the command CMDA, fulfilling the command CMDB generates a first set of "M" events EVBA 11 to EVBA 1M and a second set of "M" events EVBA 21 to EVBA 2M, in which M is 1 or more. Again, one or more events may be sent to each of one or more endpoints or data centers listed in the U LIST 112 for updating the remote locations. It is noted that these events may be used by subscribers for a number of purposes including maintaining data mirrors, updating status, providing error notifications, ensuring security, and many other purposes.

The set of events EVAA 11 to EVAA 1N or any other event or set of events may be "provisioning" events that are sent out when an endpoint is newly created or provisioned or even substantially modified. In addition, provisioning events may be sent from an established endpoint to a newly created or provisioned endpoint that is to serve as a proxy for the local endpoint. Such provisioning events may be sent to other endpoints to create or otherwise establish a mirrored copy of the local state information, in which case the events include the mirrored data to be stored by the one or more proxy endpoints.

There are several data activities that may occur for an infrastructure including the infrastructure AAA 102. A "transaction" is a unit of change for object data stored by the system described in a way that allows the system to recreate the object data storage by repeating transactions against another data store. Transactions are used for maintaining backups and mirrors or data storage. A "checkpoint" is a point in time marker used with transactions to identify which transactions have been applied to a data storage system. Checkpoints allow applied transactions to be ignored when reviewing transactions for mirrors. An event, for example, may include one or more transactions and corresponding checkpoints for verifying updates to state information.

An "activity log" includes records of activity against a system that are not directly the object data. Activity logs supplement the actual data values by providing information about who made changes and additional system status information. It is possible to have many or no logs for any transaction. Activity logs are not considered in transactions. Typically, activity logs include severity levels from trace, debug, info, warning and fatal error.

A "job log" includes records of activity by an agent on behalf of the system that are not directly the object data. Job logs provide audit records for agent operation and troubleshooting. They are typically unstructured data such as command output and error logs. It is possible to have many or no transactions during a single job log depending on the operations by the agents. Typically, job logs are not included in data mirrors. A "system change" is a change to the overall state or configuration of the system itself outside of the data that it manages. This could include the addition of new plugins, content packs or extensions. It also includes initial bootstrapping and shutdown operations for the system. System changes may occur outside of the normal data and logging states. An event may be tied to one or more of the data activities listed above and may be considered an umbrella term for notifications related to any of these data activities.

Figure 2:
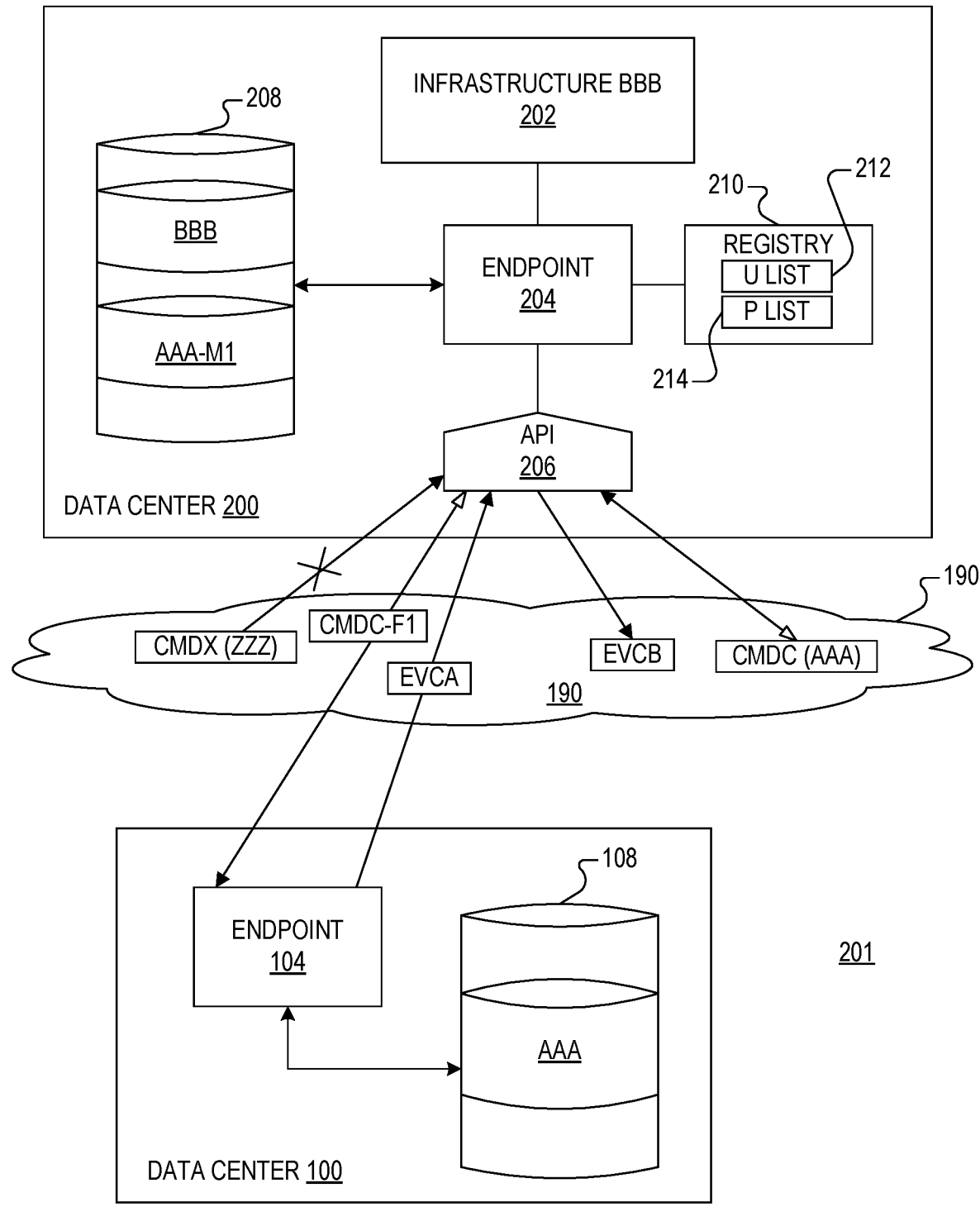
FIG. 2 is a simplified block diagram of a federation illustrating proxy synchronization implemented according to one embodiment of the present disclosure.

FIG. 2 is a simplified block diagram of a federation 201 illustrating proxy synchronization implemented according to one embodiment of the present disclosure. The federation 201 includes the data center 100 and another data center 200 both interfaced via the communication network 190, in which the data center 200 includes a data center infrastructure BBB 202 managed by a corresponding endpoint 204. The data center 200, which is similar to the data center 100, includes the infrastructure BBB 202, an endpoint 204, an API 206, a storage 208, and a registry 210, which are similar to the infrastructure AAA 102, the endpoint 104, the API 106, the storage 108 and the registry 110, respectively, of the data center 100. The registry 210 includes a U LIST 212 similar to the U LIST 112. The storage 208 for the endpoint 204 stores a state BBB generally defining the collective state of the infrastructure BBB 202. The data centers 100 and 200 may be remotely located yet may communicate with each other via the communication network 190. The data center 100 shown in FIG. 2 is illustrated in simplified format in which is it understood that it may be the same as that shown in FIG. 1.

The registry 210 of the endpoint 204 may further include a "proxy" list (P LIST) 214 that lists one or more external endpoints for which the endpoint 204 serves as a proxy for communicating command or requests for modifying the state information of those external endpoints. An endpoint that serves as a proxy for at least one other endpoint is referred to as a "proxy" endpoint (or a manager). The P LIST 214 may also include any requisite security credentials (username/password, security tokens, etc.) for accessing each edge endpoint and/or corresponding data center for which the endpoint 204 serves as proxy. When the endpoint 204 serves as a proxy, the storage 208 stores a mirrored copy of state information that is owned by another endpoint. The endpoint 204 at the data center 200 is not authorized to modified locally stored mirrored information for other endpoints, but instead forwards a received command to one or more endpoints listed in the P LIST 214 of the registry 210. The endpoint that owns the state information to be modified in accordance with the command, performs the change to the local infrastructure, updates the corresponding locally stored state, then sends out one or more events as previously described herein. Each endpoint receiving the events update the mirrored state information stored locally at the corresponding data center.

The endpoint 204 at data center 200 operates as a proxy endpoint for the endpoint 104, in which the storage 208 locally stores a state AAA-M1 which is mirrored copy of the state AAA of the infrastructure AAA 102. A command CMDC (AAA) received by the endpoint 204 from the communication network 190 via the API 206 targets the state AAA owned by the endpoint 104 at data center 100 (as indicated by the parenthetical information). The endpoint 204 accesses the storage 208 and identifies locally stored AAA-M1 as read-only and owned by another endpoint, namely endpoint 104. Thus, the endpoint 204 has access to but cannot autonomously amend the state AAA-M1. The P LIST 214 of the registry 201 of the data center 200 includes the endpoint 104 along with any requisite security credentials for accessing the endpoint 104 at data center 100. The endpoint 204 forwards the command CMDC as a forwarded command CMDC-F1 to the data center 100 via the communication network 190.

The command CMDC-F1 is received and performed by the endpoint 104 for updating the state AAA in the storage 108. In a similar manner as previously described for the command CMDA, while fulfilling the command CMDC-F1, the endpoint 104 creates one or more transactions and state changes within the infrastructure AAA 102 and then updates the state AAA. These transactions and state changes are announced externally in the form of one or more events, shown generally as EVCA. The one or more events EVCA are transmitted by the endpoint 104 (via API 106) to the endpoint 204 at the data center 200 (via the communication network 190 and the API 206). The event(s) EVCA authorize the endpoint 204 to update state AAA-M1, which is its locally stored mirrored copy of state AAA.

The process of updating the state AAA-M1 may cause the endpoint 204 to generate one or more events EVCB to be propagated upstream to other endpoints that may also operate as proxy endpoints for the state AAA. As an example, one or more events EVCB may be provided back to the source that originated the command CMDC received by the endpoint 204. In one embodiment the endpoint 204 may store information of the source that provided the command CMDC, so that the endpoint 204 uses the stored source information to send the event(s) EVCB via the communication network 190. Alternatively, or in addition, the proxy endpoint 204 consults the U LIST 212 and sends the event(s) EVCB to any one or more upstream proxy endpoints listed therein, which may include the original source of the command CMDC. In one embodiment, if the source of the command CMDC is not listed in the U LIST 212, then the proxy endpoint 204 may update the U LIST 212 to include this source information, such as when the command CMDC was received in the first place.

Another command CMDZ targeting a state ZZZ (shown as CMDZ (ZZZ) of another endpoint, not shown) is received via the communication network 190 by the API 206 and the endpoint 204 at the data center 200. The storage 208 does not include a mirrored copy of the state ZZZ so that the endpoint 204 does not operate as a proxy on behalf of the owner of the state ZZZ. Thus, the endpoint 204 does not forward the command CMDZ and instead provides an error notification or the like. This is illustrated by an "X" crossed through the arrow from the command CMDZ to the API 206. Although the command CMDZ may be acknowledged as being received, it is not acknowledged as being performed. Instead, an error indication may be provided in response.

It is noted that the endpoint 204 may be able to request data and events by communicating with the API 106 of the endpoint 104. This allows the endpoint 204 to add a complete mirror of the state AAA of the endpoint 104 into its own local storage 208 as the mirrored copy AAA-M1. In one embodiment, the mirrored state AAA-M1 is stored with identifying information so that the endpoint 204 is able to distinguish between its locally stored state BBB and mirrored information from other endpoints in its storage 208. Although the endpoint 204 is aware that the information stored within the storage 208 comes from one or more remote sources, it treats its local storage 208 as a single integrated database.

Although the storage 208 is shown only storing a mirrored copy of the state of only one other endpoint, it is understood that mirrored information from additional endpoints may be stored. Data sourced from a different endpoint is considered read-only for the data center 200 operating as a proxy endpoint for the other endpoint, in which the endpoint 204 does not directly manipulate the mirrored information. Instead, the mirrored information, including state AAA-M1, is only updated as a result of events forwarded from the owner endpoint at the source data center. This means that the single and authoritative owner of the data is the edge endpoint; in other words, the endpoint 104 is the single and authoritative owner of the state AAA of the infrastructure AAA 102.

Since the managing endpoint 204 cannot change storage from other endpoints, it forwards data change commands to the owner endpoint. This behavior is considered to be a command proxy. Thus, a user change request for state AAA received by the endpoint 204 at the data center 200 is not directly actionable. Since the endpoint 204 cannot directly act on that request, it forwards the command to the endpoint 104 at the data center 100 that owns the data or information (e.g., the state AAA).

Once the command is forwarded, the endpoint 104 accepts the request and sends back an appropriate command response code to the caller. In some embodiments, the response code reflects whether the command was accepted or not. It does not reflect the final status of the system because the endpoint 104 may perform numerous actions based on the forwarded command. This means that the result of forwarding and processing the command does not result in a storage update.

Storage updates for the system are managed by event propagation from the endpoint 104 to the data centers listed in its U LIST 112, which may include the endpoint B at data center 200. It is possible to have multiple proxy endpoints listed in the U LIST 112 and if so, the one or more events are sent to each. As illustrated in FIGS. 1 and 2, a single command request may result in numerous events that create status changes to many components in the mirrored copy AAA-M1. This one-to-many effect is the reason why commands are not inspected for state change updates.

Unlike commands, events are not forwarded or proxied. Instead, the federated system relies on new events being generated by the receiving endpoint during storage update and other activity in a universal endpoint event pattern. This means that downstream events for the proxy endpoint are decoupled from the events from the endpoint 104. This distinction allows filtering, security and other decisions to be made at each tier of the federated system.

At least one goal of a federated system, including the federation 201 and other federations described herein, is that operators can execute commands at any level or at any endpoint without knowledge or direct access to the edge endpoints that perform the action for changing the corresponding infrastructure state. For example, an operator may send the command CMDC to the proxy endpoint 204 without knowledge or direct access to the edge endpoint 104. Events allow operators to monitor the impact of requests as they occur. For example, the events generated by the endpoint 104 in response to the command CMDC are eventually received by the endpoint 204 for updating the mirrored state AAA-M1. At the federation level, operators can work across the system and rely on the proxy endpoints to proxy requests to the correct edge locations, and to rely on the edge and proxy endpoints to send out events to update the mirrored copies of the states throughout the federation.

Figure 3:
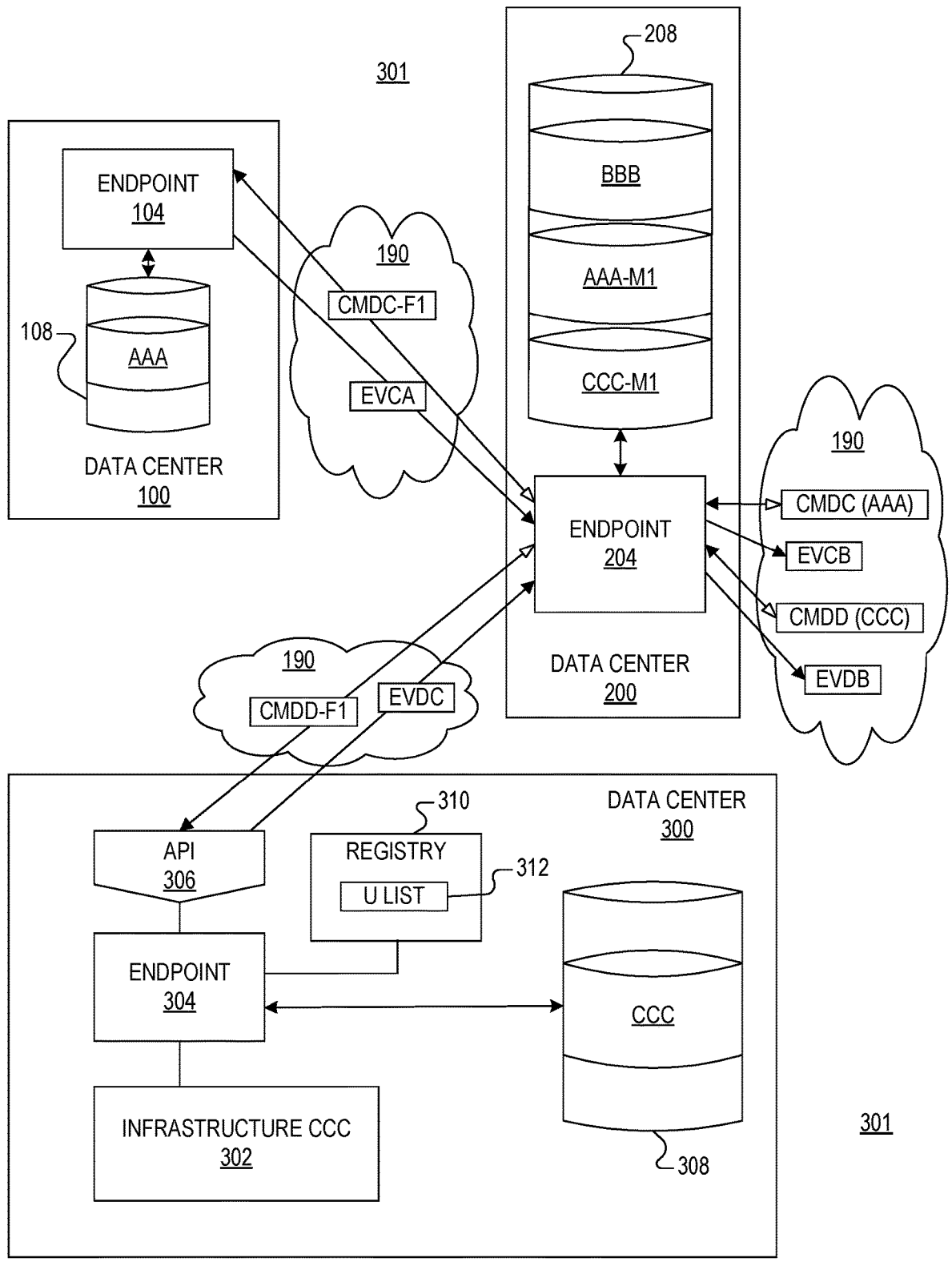
FIG. 3 is a simplified block diagram of a federation implemented according to another embodiment of the present disclosure illustrating proxy synchronization between a proxy endpoint and two edge endpoints interfaced via the computer network.

FIG. 3 is a simplified block diagram of a federation 301 implemented according to another embodiment of the present disclosure illustrating proxy synchronization the data centers 100 and 200 and another data center 300 interfaced via the communication network 190, in which the data center 300 includes a data center infrastructure CCC 302 managed by a corresponding endpoint 304. The communication network 190 is illustrated using separated graphics yet understood to part of the same communication network 190. The data centers 100 and 200 are shown in simplified format in which it is understood that they are implemented in a similar manner previously described. The endpoint 304 is similar to the endpoint 104 including similar components and may also be considered an edge endpoint. The data center 300 includes the infrastructure CCC 302, the endpoint 304, an API 306, a storage 308, and a registry 310, each implemented in a similar manner previously described for corresponding components of the data center 100. The registry 310 includes a U LIST 312 similar to the U LIST 112. The storage 308 of the data center 300 stores an infrastructure state CCC generally defining the collective state of the infrastructure CCC 302.

The storage 208 of the data center 200 includes the local state BBB of the endpoint 200 and the mirrored state AAA-M1 of the endpoint 104, but also includes a mirrored copy CCC-M1 of the state CCC of the endpoint 304. In this manner, the endpoint 204 at data center 200 operates as a manager or proxy endpoint for both endpoints 104 and 304. In order to achieve autonomous federated operation, the endpoints 104 and 304 operate independently and without any shared state information. In this embodiment, each endpoint owns and manages its own data. In this manner, each of the distributed edge endpoints, including the endpoints 104 and 304, does not require connectivity to a centralized manager for any aspect of its operation and may operate even without external control.

The command CMDC (AAA) is shown being received by the endpoint 204 in a similar manner previously described in FIG. 2, which command is forwarded as the command CMDC-F1 to the endpoint 104 at the data center 100. The endpoint 104 performs the command including update to the state AAA, and sends one or more events EVCA to the data center 200 to be received by the endpoint 204. The endpoint 204 updates its locally stored mirrored copy AAA-M1 in response to the event(s) EVCA, and generates one or more events shown as EVCB as previously described to update any upstream proxy endpoints for the endpoint 104.

In a similar manner, a command CMDD (CCC) for requesting modification of the infrastructure CCC and corresponding state CCC at the data center 300 is received by the endpoint 204, which command is forwarded as a command CMDD-F1 to the API 306 of the endpoint 304. The endpoint 304 performs the command including update to the infrastructure CCC 302 and the corresponding state CCC, and sends one or more events EVDC via the communication network 190 to the data center 200 for the endpoint 204. The endpoint 204 updates its local mirrored copy CCC-M1 in response to the event(s) EVDC, and generates one or more events shown as EVDB to update any upstream proxy endpoints for the endpoint 304.

The federation 301 illustrates how a new command can be addressed for a different endpoint, such as the endpoint 304, via the same proxy endpoint. In this case, the endpoint 204 uses the mirrored information in its storage 208 to find the correct edge endpoint that owns the data to be updated. Alternatively or in addition, the endpoint 204 may use its P LIST 214 to forward commands to update state information of any of the endpoints for which it operates as a proxy endpoint. Any events generated by the target endpoint that owns the state information are stored in the correct mirrored copy and new events are generated by the endpoint 204 for updating upstream proxy endpoints.

Each proxy endpoint, including the endpoint 204, is able to track a vast number of edge endpoints by maintaining a mirrored copy of state information for each endpoint. The primary limitation is for endpoints to process events. In addition, it is possible for the endpoint 204 to have its own managed infrastructure, shown as state BBB, so that it operates as both an edge endpoint (relative to its local state) and proxy endpoint (for other endpoints which may be edge or proxy endpoints).

Figure 4:
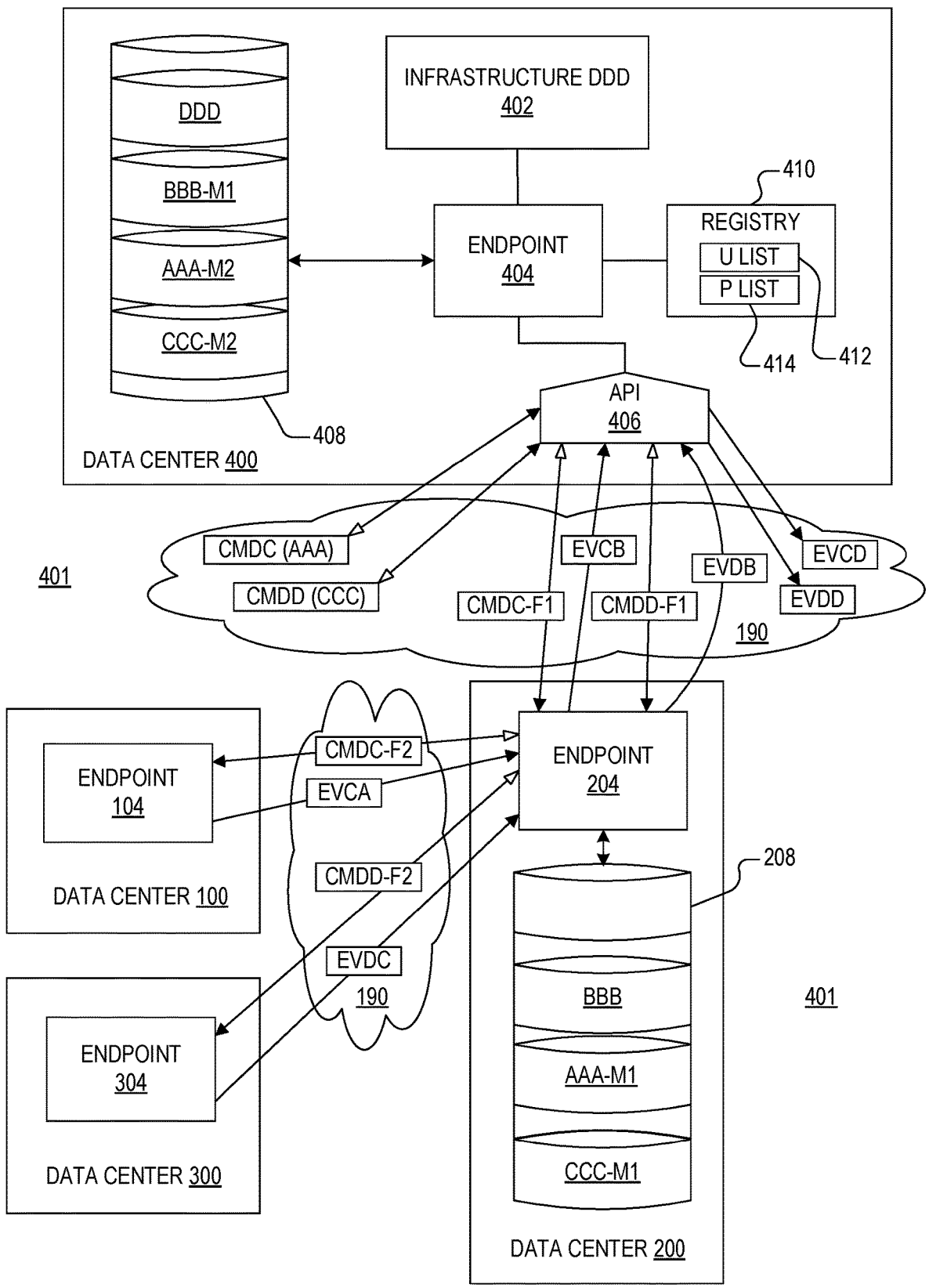
FIG. 4 is a simplified block diagram of another federation implemented according to an embodiment of the present disclosure illustrating a double proxy with indirect access.

FIG. 4 is a simplified block diagram of another federation 401 implemented according to an embodiment of the present disclosure illustrating a double proxy with indirect access (with intermediate proxies), in which the federation includes the data centers 100, 200, and 300 along with another data center 400 interfacing each other via the communication network 190 (again depicted with multiple graphics), in which the data center 400 includes a data center infrastructure DDD 402 managed by a corresponding endpoint 404. The data centers 100 and 300 are shown in very simplified format in which only their respective endpoints 104 and 304 are shown, where it is understood that each is implemented in a similar manner previously described. The data center 200 is shown in simplified form similar to that shown in FIG. 3 storing the state BBB for the corresponding infrastructure BBB 202 and mirrored states AAA-M1 (for endpoint 104) and CCC-M1 (for endpoint 304). The data center 400 is similar in configuration including similar components as the data center 200, in which the data center 400 includes the infrastructure DDD 402, the endpoint 404, an API 406, a storage 408 and a registry 410, each implemented in a similar manner previously described for the corresponding components of the data center 200. The registry 410 also includes a U LIST 412 and a P LIST 414.

The storage 408 of the data center 400 stores a state DDD generally defining the collective state of the infrastructure DDD 402. The storage 408 also stores a mirrored copy BBB-M1 of the endpoint 204, a second mirrored copy AAA-M2 of the endpoint 104, and a second mirrored copy CCC-M2 of the endpoint 304. In this manner, the endpoint 404 operates as a proxy endpoint for each of the endpoints 104, 204 and 304. In this case, however, the endpoint 404 does not have direct access to either of the data centers 100 and 300 (and thus does not have direct access to the endpoints 104 and 304). Instead, the endpoint 204 at data center 200 operates as an intermediate (or intermediary) proxy endpoint on behalf of endpoint 404 for both of the endpoints 104 and 304. The endpoint 204, operating as intermediary proxy endpoint, is not a passthrough proxy. Instead, due to federation and events, each of the endpoints 204 and 404 store a complete mirrored copy of the state BBB of the endpoint 204. By design, the endpoint 404, operating as a second level manager, interacts with the endpoint 204 operating as a first level manager in a similar manner as though the endpoint 204 were an edge endpoint.

The command CMDC (AAA) is shown received by the endpoint 404 at the data center 400 via the communication network 190 and the API 406. The endpoint 404 consults its storage 408 and determines that it has a mirrored copy AAA-M2 of the state AAA owned by the endpoint 104. The endpoint 404 does not, however, have direct access to the data center 100 or the endpoint 104 as owner of the state AAA. The endpoint 404 consults the P LIST 414 of the registry 410 in which the endpoint 204 of data center 200 is identified as the forwarding entity on behalf of the endpoint 104. The endpoint 404 thus forwards the command CMDC as command CMDC-F1 to the endpoint 204 at data center 200, which is received by the endpoint 204 in a similar manner as previously described in FIG. 3. The endpoint 204 forwards the command CMDC-F1 as command CMDC-F2 to the endpoint 104 at data center 100, which processes the command to update the infrastructure AAA 102 and state AAA and generates one or more events EVCA sent to the endpoint 204. The endpoint 204 updates its mirrored copy AAA-M1 based on the event(s) EVCA and generates one or more events EVCB that are sent to the endpoint 404 of the endpoint 404 at data center 400. The endpoint 404 updates its mirrored copy AAA-M2 based on the event(s) EVCB and generates one or more events EVCD sent to one or more upstream proxy endpoints identified in the U LIST 412.

In a similar manner, the command CMDD (CCC) is received by the endpoint 404 at the data center 400 via the communication network 190 and the API 406. The endpoint 404 consults its storage 408 and determines that it has a mirrored copy CCC-M2 of the state CCC. The endpoint 404 does not, however, have direct access to the endpoint 304 as owner of the state CCC. The endpoint 404 consults the P LIST 414 of the registry 410 in which the endpoint 204 is identified as the forwarding entity on behalf of the endpoint 304. The endpoint 404 thus forwards the command CMDD as command CMDD-F1 to the endpoint 204 at data center 200, which is received by the endpoint 204 in a similar manner as previously described in FIG. 3. The endpoint 204 forwards the command CMDD-F1 as command CMDD-F2 to the endpoint 304 at data center 300, which processes the command to update state CCC and generates one or more events EVDC sent to the endpoint 204.

The endpoint 204 updates its mirrored copy CCC-M1 based on the event(s) EVDC and generates one or more events EVDB that are sent to the endpoint 404 at the data center 400. The endpoint 404 updates its mirrored copy CCC-M2 based on the event(s) EVDB and generates one or more events EVDD sent to one or more upstream proxy endpoints identified in the U LIST 412.

This chain of command proxies and cascading events may inject additional delays into the control loop for the federated system. This is acceptable because edge autonomy is an important priority for the system so that end edge endpoints 104 and 304, implemented by the data centers 100 and 300, respectively, are expected to complete complex operations with minimal external control input. Decoupling remote commands from data synchronization events ensures that proxy endpoints are informed about incremental changes without remote managers waiting for synchronous notifications. Synchronous control does not scale for distributed systems. It is noted that contrary to conventional configurations, there is no practical limit on the number of proxy levels for this federated system. For this reason, operators may choose to tier proxy endpoints based on geographic, logical or access aggregation needs.

Although only one intermediate proxy endpoint is shown in the federation 401, namely the endpoint 204, additional intermediaries may be included. For example, one or more intermediary proxy endpoints may exist between endpoints 404 and 204 and/or one or more intermediary proxy endpoints may exist between endpoints 204 and 104 so that a command may be serially forwarded through multiple intermediate proxy endpoints before arriving at the target edge endpoint that owns the data to be modified. In addition, as further described herein, a proxy endpoint may forward multiple duplicate commands to different intermediate proxy endpoints in parallel towards the same edge endpoint. Such may be beneficial, for example, to provide redundancy and robustness. The ultimate end endpoint may be configured to detect duplicate commands in which it executes only one (such as the first received) while rejecting subsequent duplicate commands.

Figure 5:
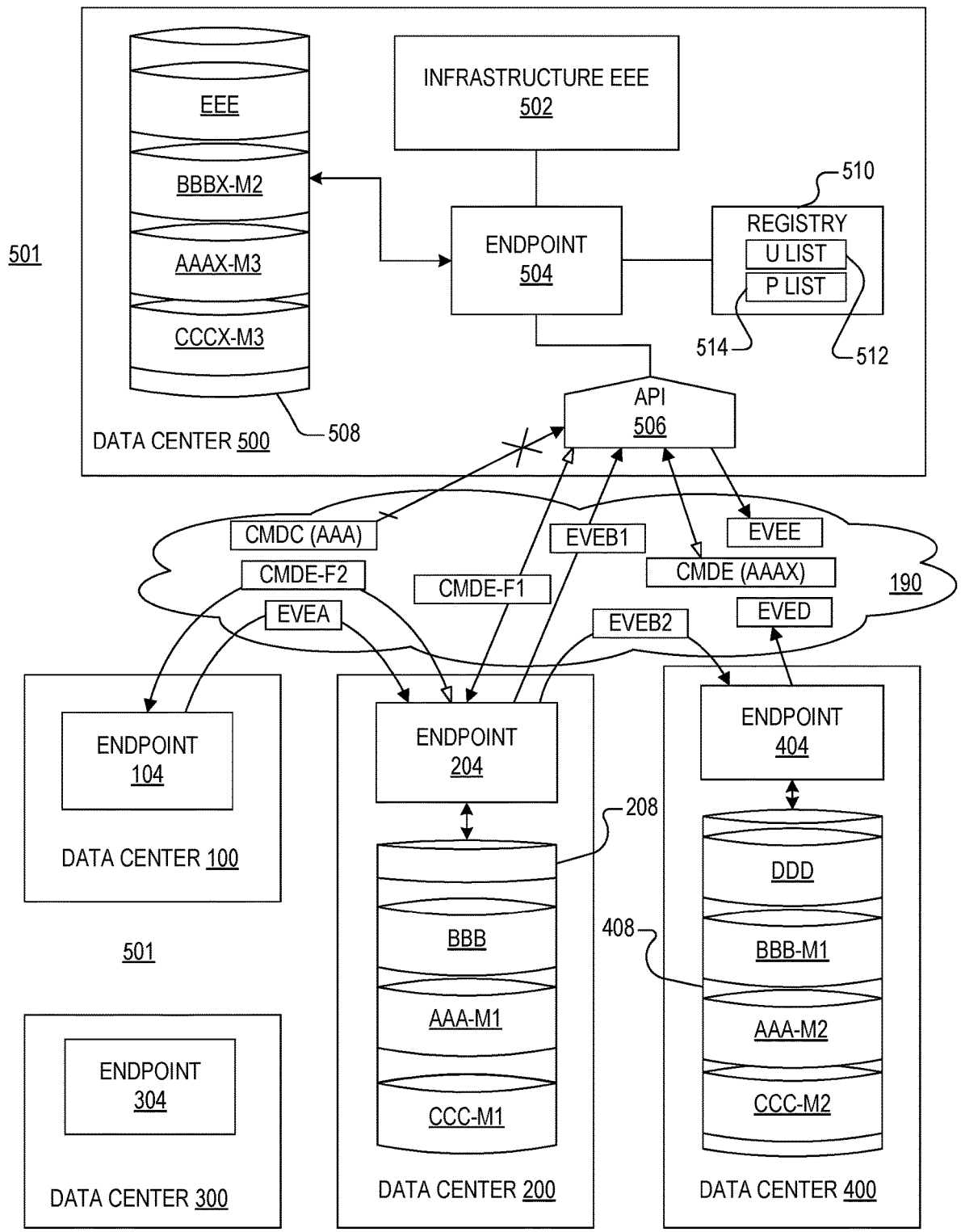
FIG. 5 is a simplified block diagram of another federation implemented according to one embodiment of the present disclosure illustrating a restricted proxy.

FIG. 5 is a simplified block diagram of another federation 501 implemented according to one embodiment of the present disclosure illustrating a restricted proxy, in which the federation 501 includes the data centers 100, 200, 300, and 400 along with another data center 500 interfacing each other via the communication network 190, in which the data center 500 includes a data center infrastructure EEE 502 managed by a corresponding endpoint 504. The data centers 100 and 300 are shown in very simplified format in which only their respective endpoints 104 and 304. The data centers 200 and 400 are shown in simplified form each including their respective endpoints and storage. The data center 500 is similar in configuration including similar components as the data center 200, including the infrastructure EEE 502, the endpoint 504, an API 506, a storage 508 and a registry 510. The registry 510 also includes a U LIST 512 and a P LIST 514.

The storage 508 of the endpoint 504 stores a state EEE generally defining the collective state of the infrastructure EEE 502. The storage 408 also stores a partial mirrored copy BBBX-M2 of the endpoint 204, a partial mirrored copy AAAX-M3 of the endpoint 104, and partial mirrored copy CCCX-M3 of the endpoint 304, in which an "X" appended to the state name indicates a partial mirrored copy rather than a complete mirrored copy. In the restricted access scenario, the intermediate endpoints, such as the endpoint 204, do not send all events to the endpoint 504 operating as a second level manager. Restricting the data and events means that the endpoint 504 only maintains partial mirrored states of data from other endpoints rather than complete mirrored states. Filtering could be performed based on numerous criteria including security, tenant, geography, or arbitrary rules.

In a similar manner as described for the federation 401, the endpoint 504 in the federation 501 operates as a proxy endpoint for, but does not have direct access to each of the endpoints 104 and 304, in which the endpoint 204 operates as an intermediate proxy endpoint for both of the endpoints 104 and 304 in relation to the endpoint 404. In a similar manner, the endpoint 504 in the federation 501 operates as a proxy endpoint for, but does not have direct access to, each of the endpoints 104 and 304. Instead, the endpoint 204 operates as an intermediate proxy endpoint for both of the endpoints 104 and 304 in relation to the endpoint 504. However, since each endpoint is independent, operators making command requests are restricted based on the items available in the storage of the particular endpoint. If a request cannot be found in the mirrored states in the storage of the endpoint, then the endpoint rejects the command and does not forward the command. In this mirror miss case, the endpoint would simply respond with a "target not found" response.

As an example, if the command CMDC (AAA) targeting the complete state AAA is sent to the endpoint 504 at state 500, and the command implicates portions of the state AAA that are not found in the partial mirrored copy AAAX-M3 in the storage 508, meaning that the command implicates data within state AAA but beyond the bounds of the partial mirrored state AAAX, then the endpoint 504 does not forward the command but instead rejects the command and responds with an error or "target not found" response. This is illustrated by an "X" crossed through the arrow from the command CMDC to the API 506.

Consider instead a command CMDE (AAAX) targeting partial state AAAX which is found in the partial mirrored copy AAAX-M3 in storage 508 by the endpoint 504. In this case the endpoint 504 forwards the command CMDE as CMDE-F1 to the endpoint 204 at data center 200, and the endpoint 204 determines that the command CMDE-F1 is found in the partial mirrored copy AAA-M1 in storage 208. Thus the endpoint 204 forwards the command CMDE-F1 as CMDE-F2 to the endpoint 104 at data center 100. The endpoint 104 makes the update to the applicable portion of the infrastructure AAA 102 and state AAA, and sends one or more events EVEA to the endpoint 204. The endpoint 204 makes the update to the partial mirrored copy AAA-M1 in storage 208, and sends one or more events EVEB1 to the endpoint 504 and also sends one or more events EVEB2 to the endpoint 404. The U LIST 412 may include corresponding links to the endpoints 404 and 504. The endpoint 504 updates AAAX-M3 and sends one or more events EVEE, and the endpoint 404 updates AAA-M2 and sends one or more events EVED. Thus, the applicable portion of the complete state AAA is updated along with the partial mirrored copies AAA-M1, AAA-M2 and AAA-M3.

Figure 6:
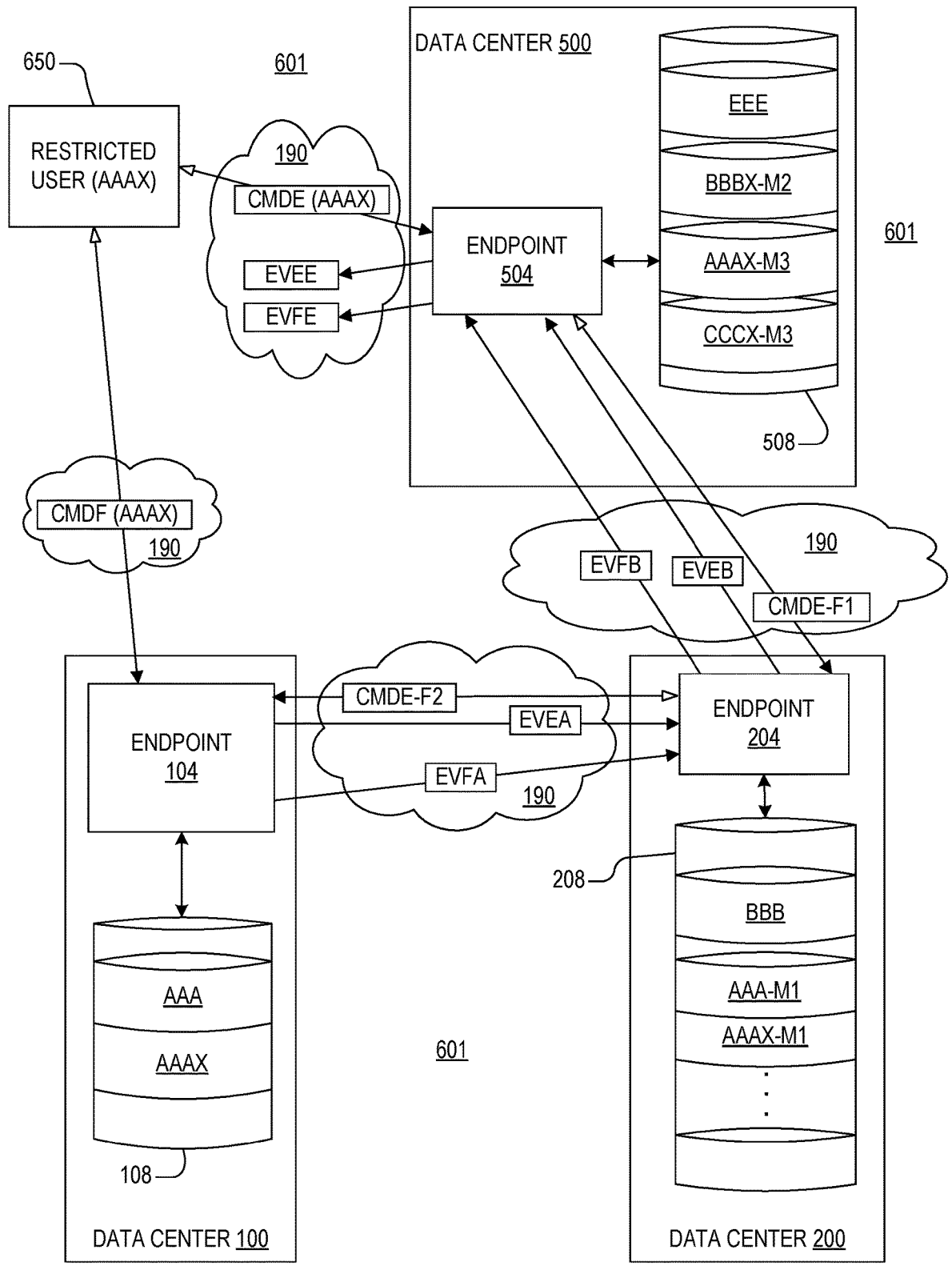
FIG. 6 is a simplified block diagram of another federation implemented according to one embodiment of the present disclosure illustrating an extended restricted proxy.

FIG. 6 is a simplified block diagram of another federation 601 implemented according to one embodiment of the present disclosure illustrating an extended restricted proxy, in which the federation 601 at least includes the data centers 100, 200, and 500 interfacing each other via the communication network 190 (again depicted with multiple graphics). Additional data centers may be included, such as the data centers 300 and 400, among others. The data centers 100, 200, and 500 are shown in simplified format including their respective endpoints and storage. Also included is a restricted user 650 that has limited access to the state AAAX, meaning only a portion of the complete state AAA of the data center 100.

In a similar manner as shown in FIG. 5, the restricted user 650 may submit the command CMDE (AAAX) directed towards the partial state AAAX to the endpoint 504 at data center 500. As previously described, the endpoint 504 forwards the command CMDE as command CMDE-F1 to the endpoint 204 at data center 200, and the endpoint 204 forwards the command CMDE-F1 as command CMDE-F2 to the endpoint 104 at data center 100. The endpoint 104 performs the command CMDE-F2 and modifying the state AAA, and the endpoint 104 then sends one or more events EVEA to the endpoint 204 at data center 200. The endpoint 204 receives the event(s) EVEA, updates AAA-M1 accordingly, and sends one or more events EVEB to the endpoint 504 at data center 500. The endpoint 504 receives the events EVEB, updates AAAX-M3 accordingly, and sends out one or more events EFEE, and so on.

Alternatively, the restricted user 650 may submit another command CMDF (AAAX) directly to the endpoint 104 at data center 100. The endpoint 104 performs the command CMDF modifying the state AAA (meaning, a portion AAAX of state AAA), and the endpoint 104 then sends one or more events EVFA to the endpoint 204 at data center 200. The endpoint 204 receives the event(s) EVFA, updates AAA-M1 accordingly, and sends one or more events EVFB to the endpoint 504 at data center 500. The endpoint 504 receives the events EVFB, updates AAAX-M3 accordingly, and sends out one or more events EFFE, and so on. The restricted user 650 may or may not have direct access to the endpoint B at data center 200.

The storages 108 and 208 of the endpoints 104 and 204 at data centers 100 and 200, respectively, have been expanded to show that each storage may store both the complete state information along with the partial state information. As shown, the storage 108 includes the partial state AAAX in which the endpoint 104 is the owner. Also, the storage 208 includes a complete mirrored copy AAA-M1 along with a partial mirrored copy AAAX-M1. When the state AAA is updated by the endpoint 104 in response to either command CMDE-F2 or CMDF, the endpoint 104 also updates the partial state AAAX accordingly. Similarly, when the mirrored copy AAA-M1 is updated by the endpoint 204 in response to either of the event(s) EVEA or EVFA, the endpoint 204 also updates the partial mirrored copy AAAX-M1 in the same manner. It is noted that the events need not be modified for the case in which a storage includes both a complete and a partial copy of mirrored information, since it is understood that the same information is updated in each.

Although not shown, the configuration shown in FIG. 6 may be extended even further to include multiple partial state information for different restricted users. For example, a first restricted user may have access to first partial state information AAAX1, a second restricted user may have access to second partial state information AAAX2, and so on, in which each partial state information is a portion of the complete state information AAA. Although the partial state information AAAX1 and AAAX2 may include overlapping information, the different partial state information may be separate from each other. Thus when the first restricted user sends a command to update AAAX1, both AAAX1 and AAA are updated although AAAX2 may remain unmodified. The same is true for the mirrored information stored in the proxy endpoints upstream.

The extended restricted proxy shown by the federation 601 illustrates how multi-tenant or restricted information can be managed. This is important because a restricted view does not rely only on limited mirrors to obscure data. The owning endpoints enforce security on their full models based on their security profiles. There are many reasons to create proxy endpoints with limited mirrors. For example, a managed service provider may have data of multiple tenants which is managed by an endpoint (each tenant being a restricted user). A tenant may desire to manage their own endpoint or may have additional endpoints outside of the service provider's control. In this scenario, the service provider's endpoint selectively forwards events to different endpoints based on tenant ownership of the infrastructure. Each tenant's endpoint may have a different subset of the service provider data. In addition, the tenant may have data that is not known to the service provider.

Figure 7:
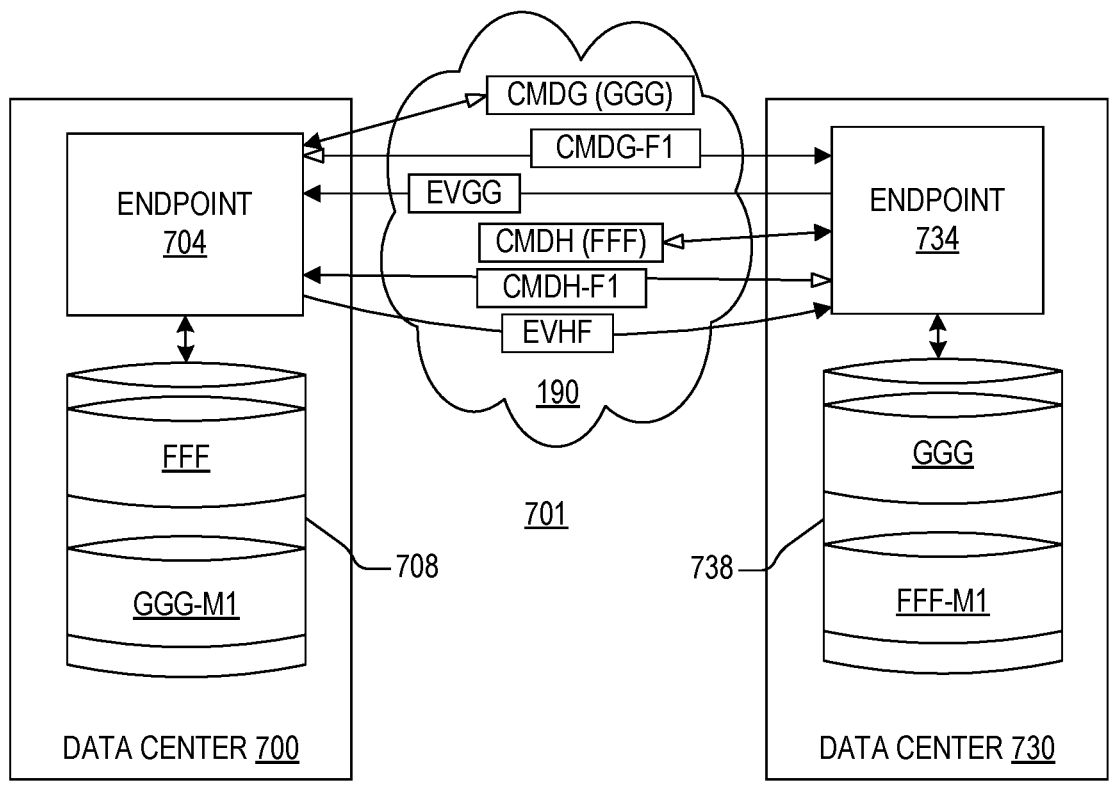
FIG. 7 is a simplified block diagram of another federation implemented according to one embodiment of the present disclosure illustrating bidirectional sharing.

FIG. 7 is a simplified block diagram of another federation 701 implemented according to one embodiment of the present disclosure illustrating bidirectional sharing. The federation 701 includes a data center 700 with an endpoint 704 and a data center 730 with an endpoint 734 interfacing each other via the communication network 190. The data centers 700 and 730 are shown in simplified format in which only their endpoints 704 and 734 and storages 708 and 738, respectively, are shown, where it is understood that the remaining components (infrastructure, API, registry) are included in similar manner as previously described. The storage 708 of the endpoint 707 stores its state information FFF and the storage 738 of the endpoint 738 stores its state information GGG. The storage 708 of the endpoint 704 also stores a mirrored copy GGG-M1 of the state information of the endpoint 738, and the storage 738 of the endpoint 734 also stores a mirrored copy FFF-M1 of the state information of the endpoint 704. In this manner, the endpoints 704 and 734 are peers of each other each storing the state information of the other and each operating as proxy of the other.

The federation 701 shows how that is possible for edge endpoints to also act as proxy endpoints to share data bidirectionally instead of in a strict hierarchy. In this scenario, the endpoints 704 and 734 mirror data from each other as peers. This configuration is useful for high availability and redundant storage. Even in a peered configuration, there is still only one owner for data so multi-master problems are avoided. This is possible because each item in storage has a unique endpoint affiliation. This peering approach is important because it shows that the distributed edge endpoint proxy model does not require a control hierarchy because any endpoint in the federation can serve both edge and proxy or manager roles.

A command CMDG (GGG) targeting the state GGG sent to the endpoint 704 at data center 700 is forwarded as command CMDG-F1 to the owner endpoint 734 at data center 730. The endpoint 734 updates the state GGG and sends one or more events EVGG back to the endpoint 704 at data center 700 enabling the endpoint 704 to update the mirrored state GGG-M1. In a similar manner, a command CMDH (FFF) targeting the state FFF sent to the endpoint 734 at data center 730 is forwarded as command CMDH-F1 to the owner endpoint 704 at data center 700. The endpoint 704 updates the state FFF and sends one or more events EVHF back to the endpoint 734 at data center 730 enabling the endpoint 734 to update the mirrored state FFF-M1.

Figure 8:
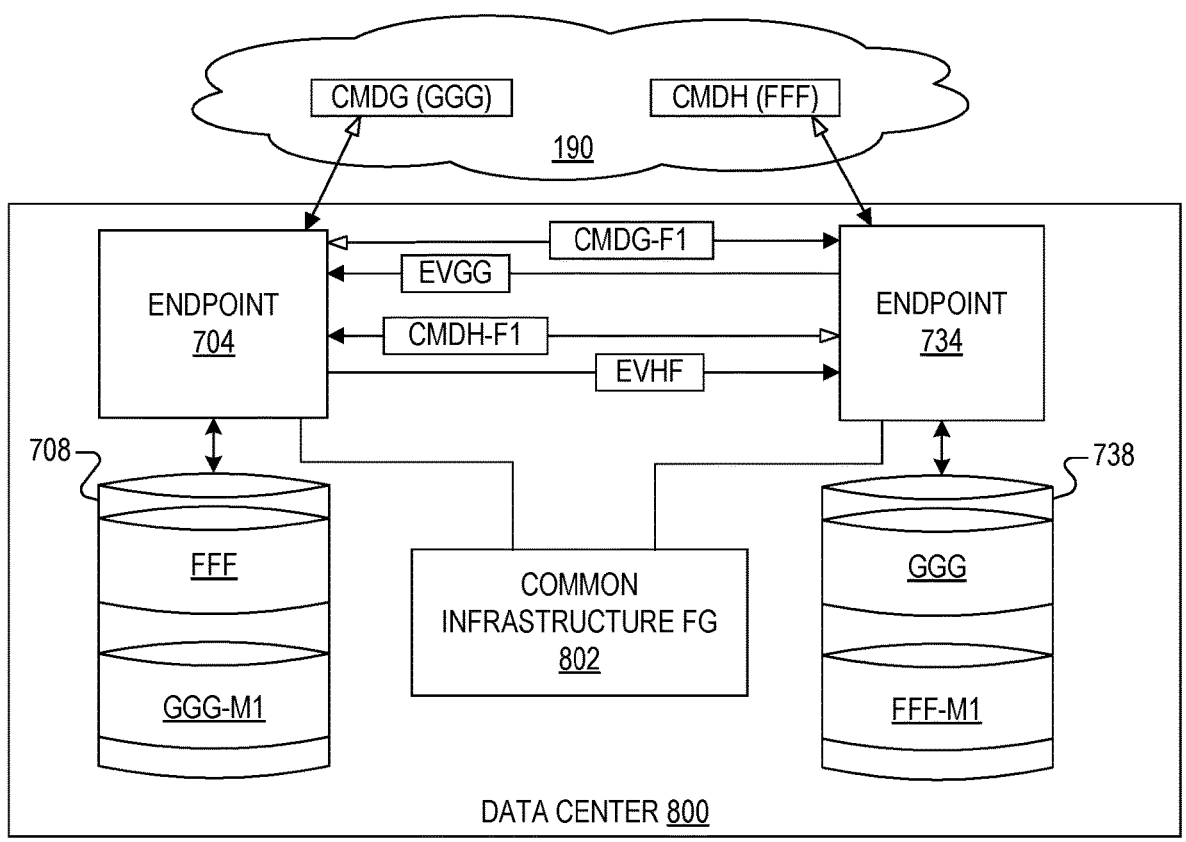
FIG. 8 is a simplified block diagram of another federation implemented according to one embodiment of the present disclosure illustrating bidirectional sharing between two endpoints located at a common data center.

FIG. 8 is a simplified block diagram of another federation 801 implemented according to one embodiment of the present disclosure illustrating bidirectional sharing between two endpoints located at a common data center or data center 800 with a common data center infrastructure FG 802. The components of both of the endpoints 704 and 734 at data centers 700 and 730, respectively, are incorporated within the data center 800, except that the separate infrastructures are combined into the common infrastructure FG 802. In this manner, the federation 801 is a variation of the federation 701 in a highly available configuration in which two independent endpoints are managing the same infrastructure. The endpoints 704 and 734 and the storages 708 and 738, respectively, are included within the data center 800. The storage 708 stores its state information FFF along with a mirrored copy GGG-M1, and the storage 738 stores its state information GGG along with a mirrored copy FFF-M1. Although not shown, each of the endpoints 704 and 734 expose an API for interfacing the network 190 in similar manner previously described.

The responses to each of the commands CMDG (GGG) and CMDH (FFF) from the communication network 190 are handled in substantially similar manner except that the forwarded commands and the corresponding generated events may be communicated locally rather than via the communication network 190. In this configuration, the endpoints 704 and 734 are aware of their paired status and can be configured to take over the mirrors in the event of a failure.

Figure 9:
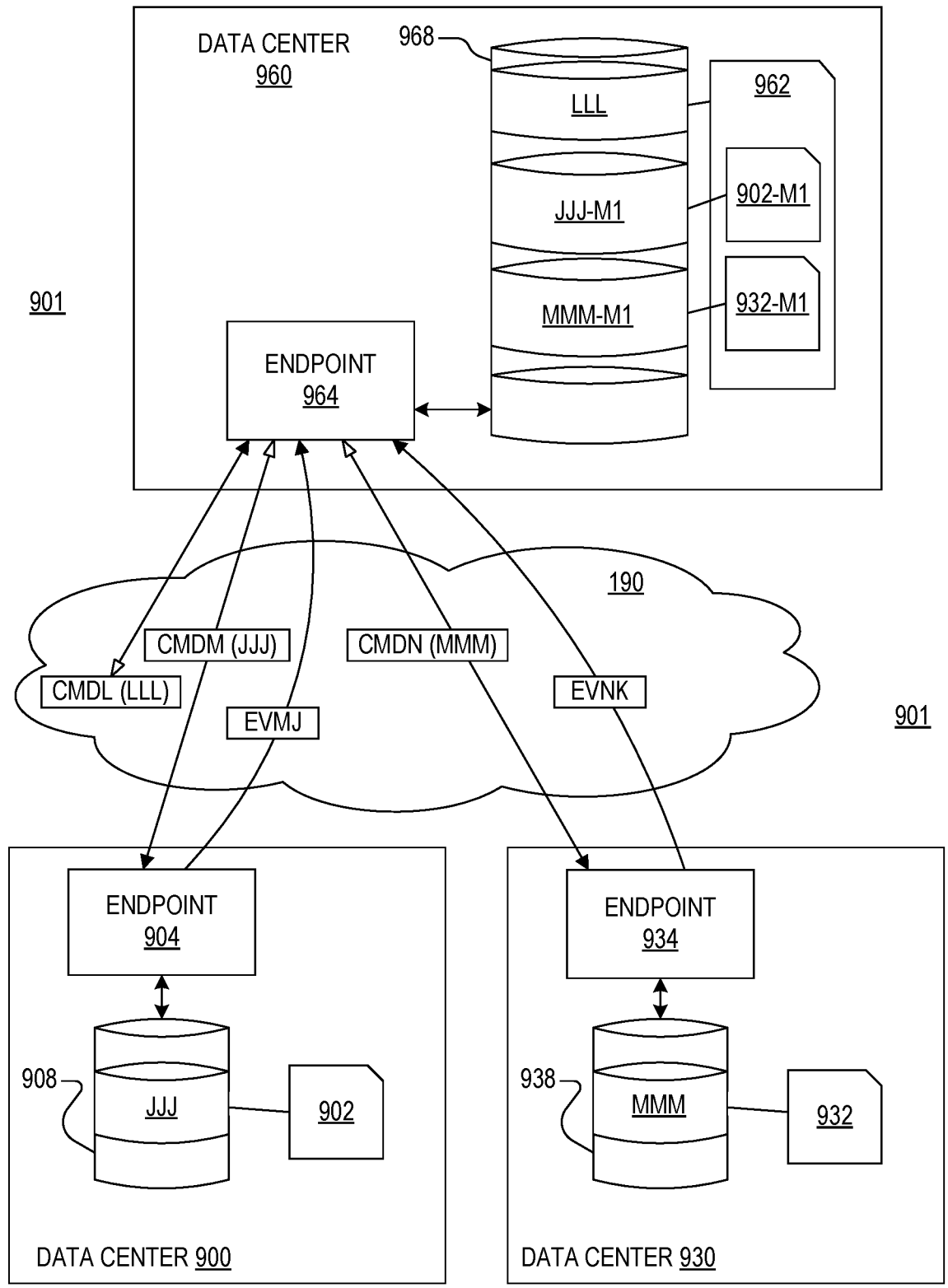
FIG. 9 is a simplified block diagram of another federation implemented according to one embodiment of the present disclosure illustrating resource data sharing.

FIG. 9 is a simplified block diagram of another federation 901 implemented according to one embodiment of the present disclosure illustrating resource data sharing. The federation 901 includes a data center 900 with an endpoint 904 owning a state JJJ stored in storage 908, a data center 930 with an endpoint 934 owning a state MMM stored in a storage 938, and a data center 960 with an endpoint 960 owning a state LLL stored in a storage 968 interfacing each other via the communication network 190. The data centers 900, 930 and 960 are each shown in simplified format including only their endpoints and storages, where it is understood that the remaining components (infrastructure, API, registry) are included for each endpoint in similar manner as previously described. The endpoint 904 at data center 900 includes an object 902 linked to the state JJJ in which the object 902 is also owned by the endpoint 904. Similarly, the endpoint 934 at data center 930 includes an object 932 linked to the state MMM in which the object 932 is also owned by the endpoint 934.

The storage 968 at data center 960 includes an object 962 linked to the state LLL in which the object 962 is also owned by the endpoint 964. The storage 968 stores a state JJJ-M1 which is a mirrored copy of the state JJJ of the endpoint 904, and also stores an object 902-M1 linked to the state JJJ-M1 in the storage 968, in which object 902-M1 is mirrored copy of the object 902. Likewise, the storage 968 stores a state MMM-M1 which is a mirrored copy of the state MMM of the endpoint 934, and also stores an object 932-M1 linked to the state MMM-M1 in the storage 968, in which object 932-M1 is mirrored copy of the object 932. The object 962 further contains references to the mirrored objects 902-M1 and 932-M1.

The object 962 including links or references to the objects 902 and 932 enable a multiple pool of shared resources. The objects 902 and 932 may each represent, for example, device data for sharing an associated device (e.g., server or memory or storage or the like) and the object 962 may represent a computer cluster or the like. For example, servers from multiple data centers may be available to users from any location. Creating a resource pool at a proxy level allows users to make a single request that is fulfilled from servers from multiple locations. A request presented to the endpoint 964 may enable use of servers located at the corresponding data centers 900 and 930 managed by the endpoints 904 and 934, respectively. In some cases, the user may not even be aware of the location of the servers provided. In other cases, the user may specifically request servers from multiple locations and be taking advantage of the proxy as an aggregation point.

As a consequence of using data from mirrors, an update request for the object 962 and associated data may trigger proxy updates to referenced objects 902-M1 and 932-M2. As per normal operation, changes to the mirrored data is reflected using event synchronization. For example, a command CMDL (LLL) targeting the state LLL may also invoke updates to one or both states JJJ and MMM as a consequence of linked data via object 962 linking the objects 902-M1 and/or 932-M1. If so, the endpoint 964 does not directly update JJJ-M1 and/or MMM-M1 but instead generates separate commands to the associated endpoints 904 and/or 934. As shown, the endpoint 964 may generate and send separate (not forwarded) command CMDM (JJJ) to the endpoint 904 targeting an update to state JJJ, and may generate and send separate (not forwarded) command CMDN (MMM) to the endpoint 934 targeting an update to state MMM. The endpoint 904 updates state JJJ and responds with one or more events EVMJ received by the event controller 964 for updating JJJ-M1, and the endpoint 934 updates state MMM and responds with one or more events EVNK received by the event controller 964 for updating MMM-M1.

FIG. 10 is a simplified block diagram of an exemplary registry 1010 implemented according to one embodiment of the present disclosure that may be used by any of the endpoints previously described. The registry 1010 includes an exemplary update list (U LIST) 1012 and an exemplary proxy list (P LIST) 1014. An update list includes information about one or more other endpoints that may store a mirrored copy of all or a portion of the state of the local endpoint being updated or of a mirrored state locally stored and updated. A proxy list includes information about one or more other endpoints for which the local endpoint serves as a proxy for communicating command or requests for modifying the state information of those other endpoints. The U LIST 1012 and the P LIST 1014 are shown in tabular form, but each may have any other suitable form for storing the update information.

A first column of the U LIST 1012 identifies the state and the corresponding owner in parenthesis of state information being updated. A second column of the U LIST 1012 identifies the endpoints in the form of an endpoint identifier (EPID) that are to be updated by sending one or more events as previously described. A third column of the U LIST 1012 provides the corresponding security credentials for sending the events to the identified endpoints, such as in the form of security tokens or the like.

As an example, the U LIST 1012 may be used as the U LIST 212 of the endpoint 204 shown in the federation 501 (FIG. 5). Upon receiving one or more events from endpoint 204 corresponding to updated state AAA, the endpoint 204 updates its local mirrored copy AAA-M1, and then consults the U LIST 1012 to determine that endpoints 404 and 504, which also store mirrored copies of AAA or at least portions thereof, are to be updated by sending corresponding events (e.g., EVEB2 and EVEB1, respectively) as previously described. The endpoint 204 uses the security credentials shown as CRED_D for sending events to endpoint 404 at data center 400 and uses the security credentials shown as CRED_E for sending events to endpoint 504 at data center 500. In the illustrated configuration, the U LIST 1012 includes similar information for updating state CCC of the endpoint 304. Additional endpoints may be listed depending upon the configuration. It is noted that an update list may not be provided or may otherwise be null in some cases such as an edge endpoint (e.g., endpoints 104 or 304) since the local state is known and when event information is sent to only one proxy endpoint (e.g., endpoint 204) or to a predetermined list of endpoints.

A first column of the P LIST 1014 identifies the owner endpoint by EPID and the corresponding state that is indicated to be updated by a received command or request. A second column of the P LIST 1014 lists the forwarding EPID of the corresponding endpoints to forward the received command. Recall that since the local endpoint is not authorized to directly update its locally stored mirrored copy, it instead forwards to or towards the endpoint that owns the state information to be updated. A third column of the P LIST 1014 lists the corresponding security credentials to be used with the forwarded command when sending to the identified endpoint. A fourth column of the P LIST 1014 provides any criteria that specifies conditions for sending to the identified endpoint.

The local endpoint may send the forwarded command directly to the owner endpoint. The endpoint 204 shown in the federation 501 (FIG. 5), for example, forwards received commands for updating state AAA directly to owner endpoint 104 using corresponding security credentials CRED_A, and forwards received commands for updating state CCC directly to owner endpoint 304 using corresponding security credentials CRED_C. In either case, the corresponding criteria fields are blank or null so that the commands are forwarded unconditionally.

As previously described for federation 401 (FIG. 4), the endpoint 404 does not have direct access to either endpoints 104 or 304 so that the received command is sent instead to an intermediary endpoint rather than directly to the owner endpoint. For the federation 401, for example, commands received by the endpoint 404 at data center 400 for updating state AAA or CCC are sent to endpoint 204 at data center 200 rather than being sent directly to endpoint 104 or endpoint 304, respectively. Such is the case for an endpoint W listed in the P LIST 1014 when receiving a command that requests updating corresponding state information WWW. Rather than forwarding the command directly to endpoint W, the command is forwarded to an endpoint X using security credentials CRED_X, and/or the command is forwarded to an endpoint Y using security credentials CRED_Y, and/or the command is forwarded to an endpoint Z using security credentials CRED_Z.

The corresponding criteria for state WWW specifies the conditions for forwarding a command targeting state WWW to any one or more of the endpoints X, Y or Z. The endpoint for local endpoint forwards the command to endpoint X so long as corresponding criteria CRIT_X are met, forwards the command to endpoint Y so long as corresponding criteria CRIT_Y are met, and forwards the command to endpoint Z so long as corresponding criteria CRIT_Z are met. Each of the criteria CRIT_X, CRIT_Y, and CRIT_Z specify conditions or filters or the like for determining whether the command is forwarded to the specified endpoint. One exemplary criterion may be specified dates or days of the week. Another specified criterion may be specified times of day for any date or specified dates. Another specified criterion may be specified load conditions. For example, the forwarded command may be sent to the one of the endpoints X, Y, and Z having the lowest load condition. Another specified criterion may be availability; for example, a command may be forwarded to only those endpoints that are available to receive commands.

It is noted that when multiple endpoints are specified for forwarding, such as is the case for state WWW and forwarding endpoints X, Y, and Z shown in the P LIST 1014, the corresponding criteria may overlap each other resulting in redundant forwarded commands. For example, the forwarded command may be sent to X and Y, or Y and Z, or even to X, Y and Z. In one embodiment, the endpoint may be configured to select one (or even a subset) of multiple endpoints to forward a command. In another embodiment, the endpoint may be configured to forward duplicate commands to multiple endpoints. In fact, the criteria overlap may be intentional or the criteria for multiple forwarding endpoints may be blank or null so that multiple duplicates command are sent intentionally. Multiple duplicates may advantageously provide robustness that increases the probability that an update is successfully received by the owner endpoint under a variety of conditions, such as adverse conditions or peak periods of activity or the like.

In one embodiment, the endpoint is configured to detect duplicate or redundant commands and filter accordingly. One method of detecting duplicate commands is to include checkpoint information or the like that distinguishes between different commands, and thus may also identify duplicate commands. An endpoint, such as the endpoint 104, may be configured to detect multiple redundant commands from multiple sources for modifying state AAA in the same manner. Generally, the endpoint that owns the local state executes the first command and ignores subsequent duplicate commands. Since duplicate commands may be sent by a proxy endpoint to multiple intermediate endpoints, a proxy endpoint may also receive duplicate commands for forwarding. In one embodiment, a proxy endpoint may be configured to forward the first received command and ignore duplicate commands. In another embodiment, a proxy endpoint may simply forward commands indiscriminately allowing duplicate commands to be forward, since the target endpoint successful detects and filters duplicate commands as previously described.

In a similar manner, duplicate events may be received by one or more proxy endpoints. The endpoint is configured to detect duplicate events and filter accordingly. As previously described, events may include checkpoint information used to distinguish between different events while also identifying duplicate events. In one embodiment, received original events are performed while any subsequent duplicate events are simply ignored.

FIG. 11 is a simplified block diagram of a federation 1101 illustrating endpoint synchronization according to one embodiment. The data centers 100, 200 and 400 are shown in simplified form implementing the endpoints 104, 204 and 404, respectively. The communication network 190 is not shown but is understood to be present. Site 100 includes storage 108 storing state AAA, data center 200 includes storage 208 storing a mirrored copy AAA-M1, and data center 400 includes storage 408 storing another mirrored copy AAA-M2 in a similar manner previously described. The mirrored copies AAA-M1 and AAA-M2 are intended to be duplicates of the state AAA over time.

Suppose a first scenario in which data center 100 and thus endpoint 104 is offline for a period of time and further that state AAA is nonetheless modified or updated. When endpoint 104 is back online, the mirrored copies AAA-M1 and AAA-M2 are "stale" since they have not yet been updated to reflect to current status of state AAA. The endpoint 104 recognizes this condition when it is back online, it sends one or more update events 1102 to the endpoint 204 to update the mirrored copy AAA-M1. After updating AAA-M1, the endpoint 204 sends one or more normal updates 1104 accordingly to the endpoint 404 as previously described. The endpoint 404 updates AAA-M2 accordingly. In this manner, the state information AAA remains synchronized among multiple endpoints.

Suppose a second scenario in which data center 200 and thus endpoint 204 is offline for a period of time while state AAA is modified or updated by endpoint 104. In this case, the mirrored copies AAA-M1 and AAA-M2 are again stale since they have not yet been updated to reflect to current status of state AAA. Note that endpoint 204 has direct access to endpoint 104 but that endpoint 404 has indirect access via endpoint 204, so that mirrored state AAA-M2 becomes stale while endpoint 204 is offline. When endpoint 204 is back online, it may send an update inquiry 1106 to the endpoint 104 to inquire about the status of AAA-M1 relative to AAA. The endpoint 104 determines that AAA-M1 needs updating and sends the one or more update events 1102 to the endpoint 204 to update the mirrored copy AAA-M1 in a similar manner as before. After updating AAA-M1, the endpoint 204 sends the one or more normal updates 1104 accordingly to the endpoint 404 as previously described. The endpoint 404 updates AAA-M2 accordingly. In this manner, the state information AAA remains synchronized among multiple endpoints.

Suppose a third scenario in which data center 400 and thus endpoint 404 is offline for a period of time while state AAA is modified or updated by endpoint 104. In this case, only the mirrored copy AAA-M2 may be stale since endpoint 204 remained online and presumably received update events maintaining the current status of AAA-M1. When endpoint 404 is back online, it may send an update inquiry 1108 to the endpoint 204 to inquire about the status of AAA-M2 relative to AAA-M1. The endpoint 204 determines that AAA-M2 needs updating and sends the one or more update events 1104 to the endpoint 404 to update the mirrored copy AAA-M2 in a similar manner as before. In this case, the updates 1104 are the same or similar to the normal updates that are sent as though AAA-M1 were modified. The endpoint 404 updates AAA-M2 accordingly. In this manner, the state information AAA remains synchronized among multiple endpoints.

Note that in the third scenario that the endpoint 204 need not involve endpoint 104 in order to send events to update the mirrored state information of endpoint 404. It is noted, however, that endpoint 204 may nonetheless send the update inquiry 1106 first to ensure that is has the latest updates of state AAA before responding to endpoint 404. Although only 3 endpoints are shown illustrating synchronization, it is understood that the endpoints of each of the endpoints in a given configuration are configured accordingly to synchronize state information with other endpoints.

Synchronization may include any other modifications that may occur over time. For example, the security credentials of endpoint 104 may be changed such that the corresponding security credentials for endpoint 104 stored in the P LIST 214 of endpoint 204 are no longer valid. In one embodiment, endpoint 104 at least consults its U LIST 112, among any other communication information that it may store over time, to identify other endpoints that should be updated, such as endpoint 204. The endpoint 104 sends update events, such as update events 1102, to inform other endpoints with its updated security credentials. In addition, an endpoint with modified security credentials may further consult its corresponding proxy list to update other endpoints. For example, the security credentials of endpoint 204 may be changed. In this case, the corresponding security credentials for endpoint 204 stored in the P LIST 414 of endpoint 404 are no longer valid, but also the security credentials for endpoint 204 stored in the U LIST 112 of endpoint 104 are also no longer valid. Thus, the endpoint 204 may consult both its U LIST 212 and its P LIST 214, among any other communication information that it may store over time, to identify other endpoints that should be updated with its modified security credentials.

In the event an otherwise authorized endpoint, say a first endpoint, attempts to communicate with another endpoint, say a second endpoint, with outdated security credentials that are rejected by the first endpoint, then the second endpoint may follow up by sending a subsequent update inquiry or the like to the first endpoint to receive updated security credentials. The endpoint of the first endpoint determines whether the second endpoint is, in fact, authorized, and if so, sends the update events with the updated security credentials to update the second endpoint. The authorization determination may involve any type of suitable negotiation process as understood by those of ordinary skill in the art.

Synchronization may further include the information stored within the registries of two or more endpoints. Updates to the proxy list or update list may be scheduled or shared between two or more endpoints that are authorized to share such information.

An update inquiry (such as, e.g., update inquiry 1106 or 1108 or the like) may be a status inquiry to determine availability of other endpoints including, for example, any endpoints listed within the local registry (e.g., registry 1010 including the U LIST 1012 and P LIST 1014). Status inquiries may be sent at any time, such as periodically, asynchronously (e.g., as needed), based on a predetermined inquiry schedule, etc.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. A data center with proxy synchronization as part of a distributed federation, comprising:
   a local infrastructure;
   a local endpoint that manages the local infrastructure including a communication interface for communicating via a communication network; and
   storage that stores a local state of the local infrastructure and that is controlled by the local endpoint, wherein the storage further stores at least one mirrored state in which each mirrored state comprises a mirrored copy of a state of another infrastructure controlled by another endpoint;
   wherein the local endpoint, in response to receiving a command via the communication interface that identifies a mirrored state to be changed, forwards the command via the communication interface towards another endpoint that controls the identified mirrored state.

2. The data center of claim 1, wherein the identified mirrored state was provided by at least one provisioning event sent via the communication interface from the other endpoint that controls the identified mirrored state.

3. The data center of claim 1, further comprising a registry including a proxy list that provides at least one forwarding identifier for the identified mirrored state stored in the storage, wherein the local endpoint forwards the command using one of the at least one forwarding identifier.

4. The data center of claim 3, wherein the one of the at least one forwarding identifier directly identifies the other endpoint that controls the identified mirrored state so that the command is forwarded directly to the identified endpoint.

5. The data center of claim 3, wherein the one of the at least one forwarding identifier identifies an intermediate endpoint that does not control the identified mirrored state, and wherein the command is forwarded to the intermediary endpoint.

6. The data center of claim 3, wherein the proxy list includes security credentials for at least one of the at least one forwarding identifier.

7. The data center of claim 3, wherein the proxy list includes at least one criterion for at least one of the at least one forwarding identifier that specifies at least one condition for forwarding the command.

8. The data center of claim 1, wherein the storage stores a plurality of mirrored states for a corresponding plurality of other endpoints and wherein the command identifies one of the plurality of mirrored states, further comprising a registry including a proxy list that provides at least one forwarding identifier for at least one of the plurality of mirrored states, and wherein the local endpoint forwards the command using at least one forwarding identifier from the proxy list that corresponds with the identified mirrored state.

9. The data center of claim 1, further comprising a registry including a proxy list that provides a plurality of forwarding identifiers for the other endpoint that controls the identified mirrored state, wherein the local endpoint selects at least one of the plurality of forwarding identifiers based on at least one criterion for forwarding the command from the proxy list.

10. The data center of claim 1, further comprising a registry including a proxy list that identifies a plurality of forwarding identifiers for the other endpoint that controls the identified mirrored state, wherein the local endpoint forwards the command at least once, each time using a corresponding one of the plurality of forwarding identifiers.

11. The data center of claim 1, wherein the local endpoint receives at least one event and updates the at least one mirrored state based on the at least one event.

12. The data center of claim 11, further comprising a registry that stores an update list with at least one identifier associated with the at least one mirrored state, wherein the local endpoint sends at least one event using each of the at least one identifier upon updating the at least one mirrored state.

13. The data center of claim 12, wherein the update list includes security credentials for at least one of the at least one identifier.

14. The data center of claim 1, wherein the at least one mirrored state comprises an object link for sharing resources of at least one other endpoint.

15. The data center of claim 1, wherein the at least one mirrored state comprises a partial mirrored state that does not include the entire state of another infrastructure, wherein the command references data that is beyond a bounds of the partial mirrored state, and wherein the local endpoint rejects the command.

16. A data center with proxy synchronization as part of a distributed federation, comprising:
   a common infrastructure the incorporates a first infrastructure and a second infrastructure;
   a first endpoint that is configured to manage the first infrastructure and that includes a first communication interface for communicating via a communication network;
   a second endpoint that is configured to manage the second infrastructure and that includes a second communication interface for communicating via the communication network;
   a first storage coupled to the first endpoint that stores a state of the first infrastructure controlled by the first endpoint, and that further stores a mirrored state of the second infrastructure; and
   a second storage coupled to the second endpoint that stores a state of the second infrastructure controlled by the second endpoint, and that further stores a mirrored state of the first infrastructure;
   wherein the first endpoint, in response to receiving a first change command from the communication network that identifies the mirrored state of the second infrastructure, is configured to forward the first change command to the second endpoint, and wherein the second endpoint, in response to receiving a second change command from the communication network that identifies the mirrored state of the first infrastructure, is configured to forward the second change command to the first endpoint.

17. The data center of claim 16, wherein the second endpoint is configured to update the second infrastructure and the state of the second infrastructure in response to receiving the first change command from the first endpoint and to send at least one event to the first endpoint for updating the mirrored state of the second infrastructure stored in the first storage.

18. The data center of claim 17, wherein the first endpoint is configured to update the mirrored state of the second infrastructure in the first storage upon receiving the at least one event from the second endpoint.

19. The data center of claim 16, wherein the first endpoint is configured to update the first infrastructure and the state of the first infrastructure in response to receiving the second change command from the second endpoint and to send at least one event to the second endpoint for updating the mirrored state of the first infrastructure stored in the second storage, and wherein the second endpoint is configured to update the mirrored state of the first infrastructure in the second storage upon receiving the at least one event from the first endpoint.

20. A method of proxy synchronization of a data center as part of a distributed federation, comprising:
   managing a local infrastructure with an endpoint that includes a communication interface for communicating via a communication network;
   storing a local state of the local infrastructure that is controlled by the local endpoint and storing at least one mirrored state in which each mirrored state comprises a mirrored copy of a state of another infrastructure controlled by another endpoint in the distributed federation;
   receiving a command from the communication network that identifies a mirrored state to be changed; and
   forwarding the command via the communication interface towards another endpoint that controls the identified mirrored state.

* * * * *